(12) United States Patent
Tachibana et al.

(10) Patent No.: US 10,715,686 B2
(45) Date of Patent: Jul. 14, 2020

(54) IMAGE FORMING APPARATUS WITH PUNCH DIE-SET LUBRICATION PROMPT, METHOD OF CONTROLLING THE SAME, AND STORAGE MEDIUM

(71) Applicant: CANON KABUSHIKI KAISHA, Tokyo (JP)

(72) Inventors: Yoshiro Tachibana, Kashiwa (JP); Nobuhiro Kawamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/049,665

(22) Filed: Feb. 22, 2016

(65) Prior Publication Data

US 2016/0255210 A1 Sep. 1, 2016

(30) Foreign Application Priority Data

Feb. 26, 2015 (JP) ................. 2015-037296

(51) Int. Cl.
*H04N 1/00* (2006.01)
*B26D 7/28* (2006.01)
(Continued)

(52) U.S. Cl.
CPC ............ *H04N 1/0032* (2013.01); *B26D 7/28* (2013.01); *B26F 1/02* (2013.01); *G03G 15/5016* (2013.01);
(Continued)

(58) Field of Classification Search
CPC ...... G06F 3/1218; G06F 3/1219; G06F 3/121; G03G 2215/00286; G03G 2215/00818;
(Continued)

(56) References Cited

U.S. PATENT DOCUMENTS 4,808,926 A * 2/1989 Graham .................. B21B 33/00
324/226
6,128,561 A * 10/2000 Janata ................. B60R 16/0234
701/29.5
(Continued)

FOREIGN PATENT DOCUMENTS

CN 1499316 A 5/2004
EP 0927600 A1 7/1999
(Continued)

OTHER PUBLICATIONS

Canon: "Service Manual Professional Puncher-A1 Table of Contents", XP55291898, Nov. 30, 2005.
(Continued)

*Primary Examiner* — Juan M Guillermety
(74) *Attorney, Agent, or Firm* — Venable LLP

(57) ABSTRACT

An image forming apparatus connected to a sheet hole punching apparatus that applies a punch process to a sheet, and a method for controlling the same, in which from a die-set mounted to the sheet hole punching apparatus, die-set information including at least identification information for identifying the die-set is obtained, and in association with the die-set information, a number of times that the punch process has been executed using the die-set is counted. Control is performed to prompt a user to lubricate the die-set when the number of times counted by the counter unit exceeds a threshold value.

18 Claims, 14 Drawing Sheets

(51) Int. Cl.
*G05B 15/02* (2006.01)
*G03G 15/00* (2006.01)
*B26F 1/02* (2006.01)
*G06F 3/12* (2006.01)

(52) U.S. Cl.
CPC ......... *G03G 15/6582* (2013.01); *G05B 15/02* (2013.01); *H04N 1/00007* (2013.01); *H04N 1/00037* (2013.01); *H04N 1/00055* (2013.01); *H04N 1/00466* (2013.01); *H04N 1/00639* (2013.01); *H04N 1/00832* (2013.01); *G03G 2215/00818* (2013.01); *G06F 3/121* (2013.01); *G06F 3/1229* (2013.01); *H04N 2201/0094* (2013.01)

(58) Field of Classification Search
CPC ........... G05B 2219/45137; G06K 1/20; H04N 1/00466
USPC ........................................ 358/1.15
See application file for complete search history.

(56) References Cited

U.S. PATENT DOCUMENTS

| | | | | |
|---|---|---|---|---|
| 6,163,734 | A * | 12/2000 | Shigefuji | G05B 19/19 700/160 |
| 6,344,018 | B1 * | 2/2002 | Aizawa | B21D 37/145 700/179 |
| 7,426,042 | B2 | 9/2008 | Okamoto et al. | |
| 7,627,282 | B2 * | 12/2009 | Oka | G03G 15/6541 399/410 |
| 7,826,761 | B2 | 11/2010 | Okamoto et al. | |
| 7,970,558 | B1 * | 6/2011 | Roys | G01F 15/063 702/46 |
| 8,180,144 | B2 | 5/2012 | Whiting | |
| 8,180,243 | B2 * | 5/2012 | Okamoto | G03G 15/55 358/1.1 |
| 2003/0045946 | A1 * | 3/2003 | Hattori | G05B 23/0267 700/5 |
| 2006/0257157 | A1 * | 11/2006 | Kim | G03G 15/5012 399/21 |
| 2007/0069452 | A1 * | 3/2007 | Murata | B42C 1/00 271/186 |
| 2008/0051613 | A1 * | 2/2008 | Kato | C10M 101/02 585/16 |
| 2009/0089076 | A1 * | 4/2009 | Asakimori | G03G 15/55 705/305 |
| 2009/0228982 | A1 * | 9/2009 | Kobayashi | G06F 21/10 726/26 |
| 2009/0285586 | A1 * | 11/2009 | Kawaguchi | G03G 15/55 399/12 |
| 2009/0317096 | A1 * | 12/2009 | Odaira | G03G 15/6529 399/21 |
| 2010/0077893 | A1 * | 4/2010 | Kato | G03G 15/6582 83/74 |
| 2010/0266197 | A1 | 10/2010 | Whiting | |
| 2011/0067895 | A1 * | 3/2011 | Nobe | B25B 21/00 340/680 |
| 2013/0086243 | A1 * | 4/2013 | Cho | H04L 12/282 709/223 |
| 2014/0037304 | A1 * | 2/2014 | Uenishi | G03G 21/0094 399/24 |
| 2014/0156057 | A1 * | 6/2014 | Tong | G05B 19/4065 700/175 |
| 2014/0202828 | A1 * | 7/2014 | Ishigami | G01N 35/1009 198/340 |
| 2014/0320890 | A1 * | 10/2014 | Kamasuka | H04N 1/00477 358/1.15 |
| 2015/0068844 | A1 * | 3/2015 | Strandell | F16N 29/00 184/6.1 |
| 2015/0138583 | A1 * | 5/2015 | Miyahara | H04N 1/00814 358/1.13 |

FOREIGN PATENT DOCUMENTS

| | | |
|---|---|---|
| JP | H09-174169 A | 7/1997 |
| JP | 2002-305625 A | 10/2002 |
| JP | 2007-206517 A | 8/2007 |
| JP | 2008-024406 A | 2/2008 |
| JP | 2010-169793 A | 8/2010 |
| JP | 2011-054099 A | 3/2011 |
| JP | 2011-197243 A | 10/2011 |
| KR | 10-2003-0082733 A | 10/2003 |

OTHER PUBLICATIONS

Extended European Search Report dated Aug. 5, 2016, in European Application No. 16000116.0.
Office Action dated Mar. 13, 2017, in Chinese Patent Application No. 201610092179.7.
Office Action dated Apr. 10, 2018, in Korean Patent Application No. 10-2016-0012636.
Office Action dated Oct. 22, 2018, in Japanese Patent Application No. 2015-037296.
Office Action dated Jan. 28, 2019, in Japanese Patent Application No. 2015-037296.
Office Action dated Oct. 8, 2019, in European Patent Application No. 16000116.0.

* cited by examiner

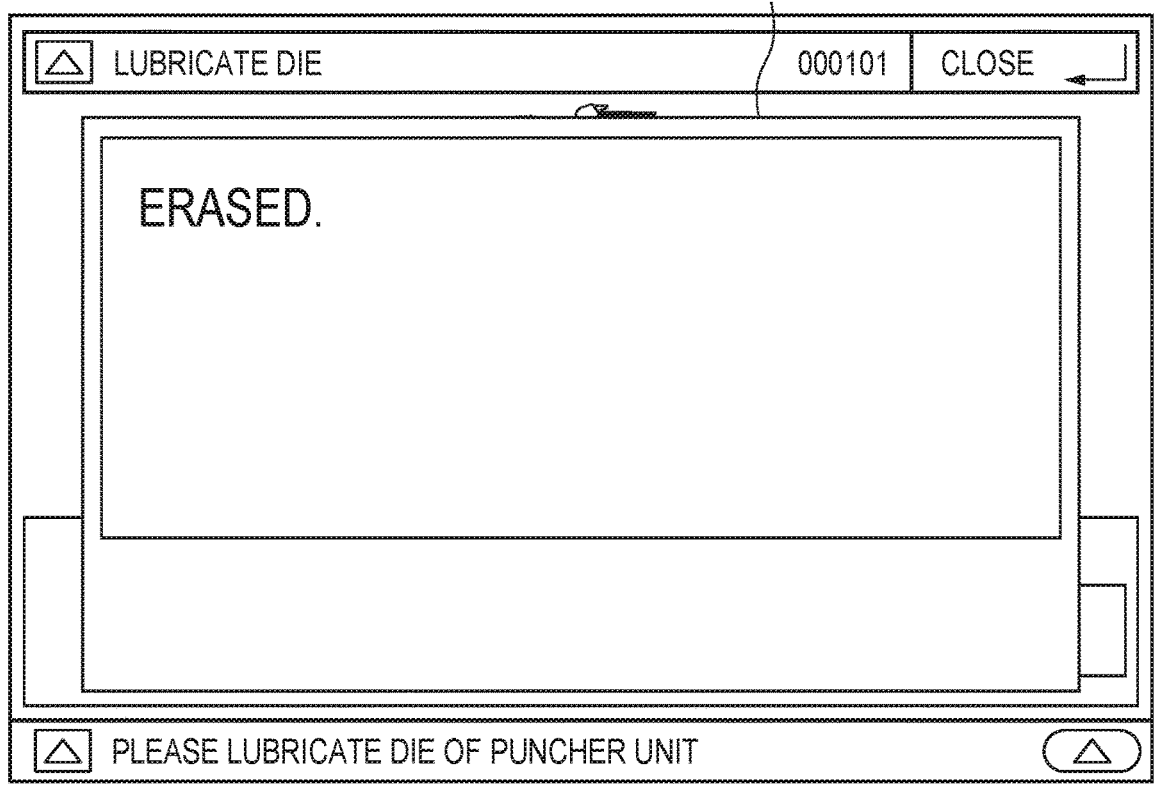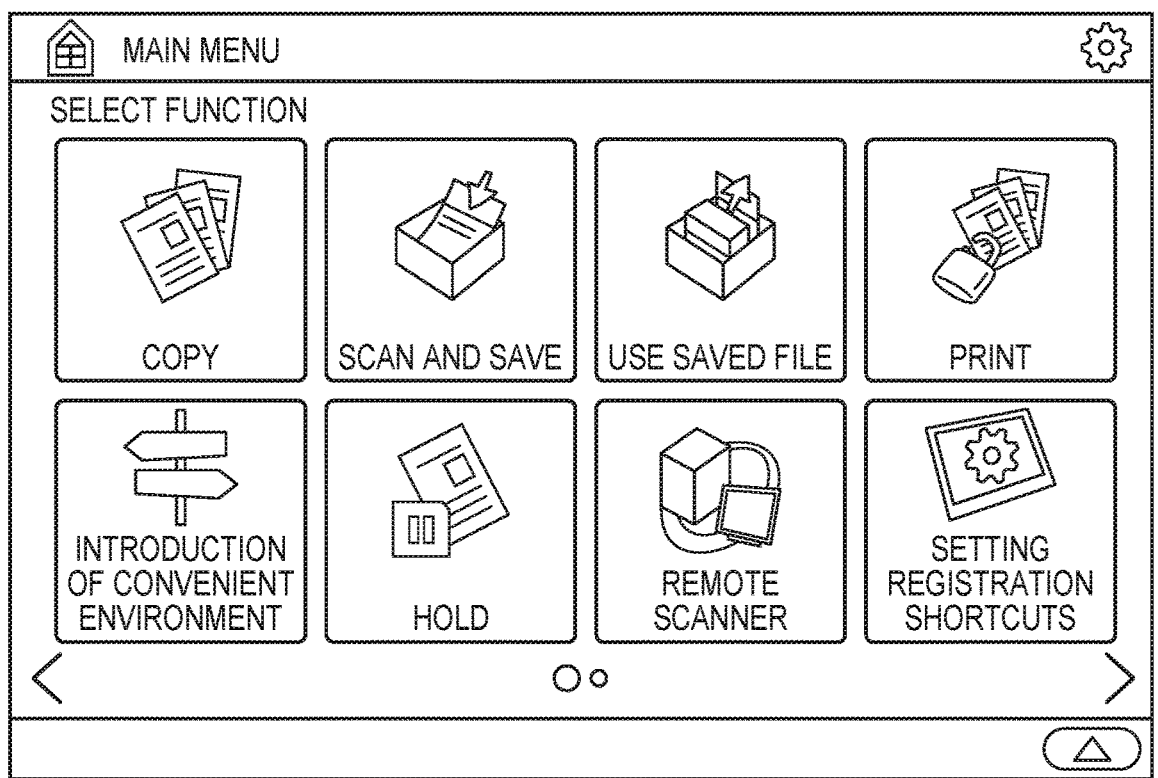

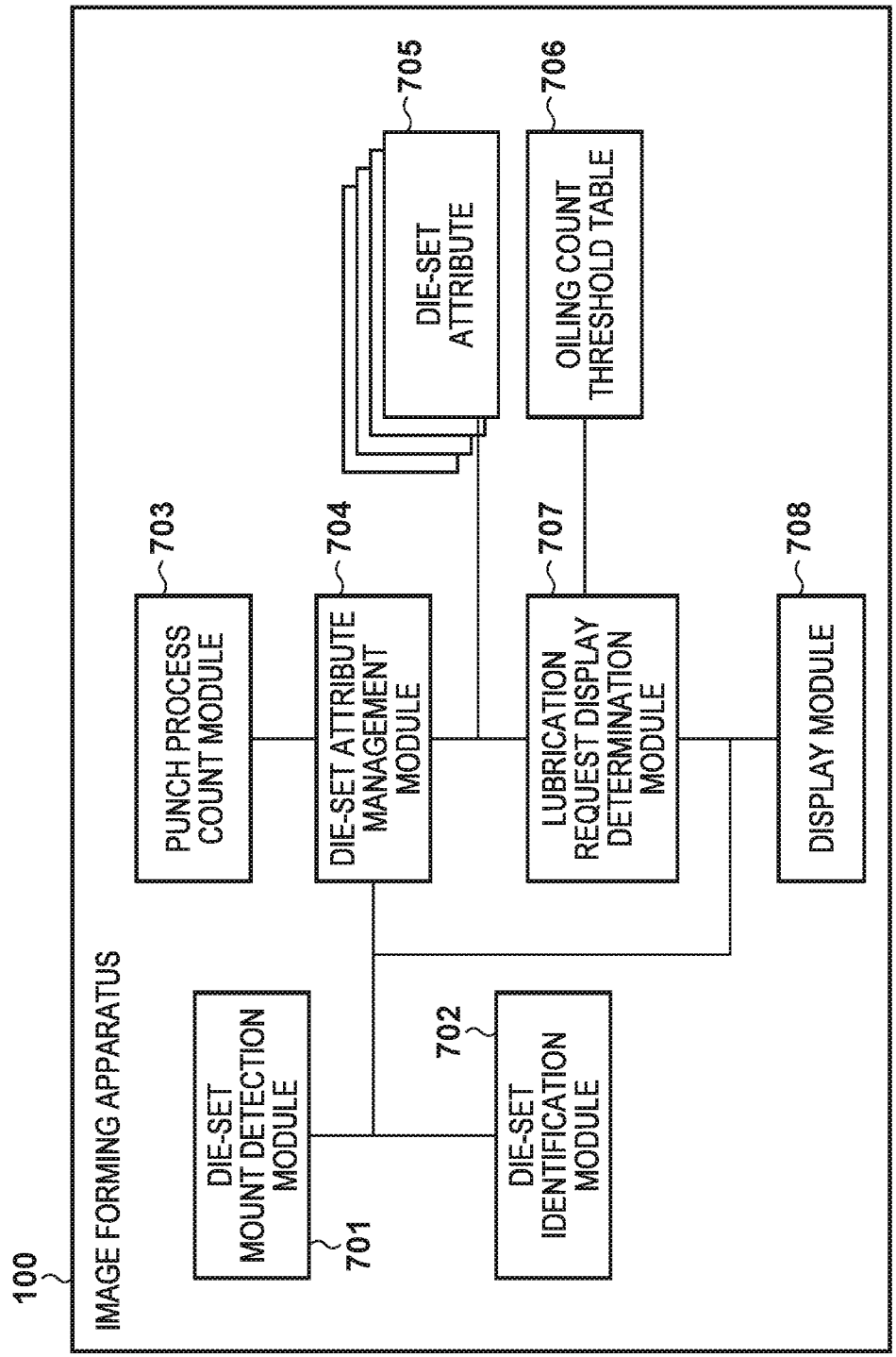

IMAGE FORMING APPARATUS WITH PUNCH DIE-SET LUBRICATION PROMPT, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

Conventionally, in a field of production printing using an image forming apparatus such as a laser printer or a digital multifunction peripheral, a sheet hole punching apparatus that applies various punch processes to printed sheets by replacing a part referred to as a die-set in which a punch baled and a die are integrated into a single body is known. There exists a usage limit for a die-set mounted in such a sheet hole punching apparatus, and when the die-set reaches the usage limit, scruffing of the periphery of the die or the punch baled occurs, and punch waste ceases to separate from the sheet, and there are cases in which these cause a jam of a printed sheet. In order to resolve this problem, Japanese Patent Laid-Open No. 2011-54099, for example, discloses a printing apparatus that stores an endurance coefficient prepared for each die-set in a storage apparatus in advance, and by calculating the consumption degree using the endurance coefficient after a punch process, can determine accurately when the usage limit is reached.

However, it is necessary that periodic maintenance work be performed by a user in order for the usage limit of a die-set to be reached, that is for the original die-set life span to be fulfilled, and lubrication work such as pouring a lubricating oil onto the die-set every predetermined number of times that the hole punching is performed is particularly essential. Furthermore, because the time period in which a die-set will degrade differs depending on the number, size, and shape of punch holes, or the like, it is necessary that the lubrication work be performed considering the work time periods that differ for each die-set.

SUMMARY OF THE INVENTION

An aspect of the present invention is to eliminate the above-mentioned problems which are found in the conventional technology.

A feature of the present invention is to provide a technique by which it is possible to prompt a user to perform work to lubricate a die-set at the optimal timing for each die-set.

According to a first aspect of the present invention, there is provided an image forming apparatus connected to a sheet hole punching apparatus that applies a punch process to a sheet, the image forming apparatus comprising: an obtaining unit configured to obtain, from a die-set mounted to the sheet hole punching apparatus, die-set information including at least identification information for identifying the die-set; a counter unit configured to count, in association with the die-set information, a number of times that the punch process has been executed using the die-set; and a control unit configured to prompt a user to lubricate the die-set when the number of times counted by the counter unit exceeds a threshold value.

According to a second aspect of the present invention, there is provided an image forming apparatus including a punch processing unit that applies a punch process to a sheet, the image forming apparatus comprising: a detection unit configured to detect whether or not a die-set is mounted to the punch processing unit; an obtaining unit configured to obtain, from a die-set mounted to the punch processing unit, die-set information including at least identification information for identifying the die-set; a counter unit configured to count, in association with the die-set information, a number of times that the punch process has been executed using the die-set; and a control unit configured to control to display on a display unit a screen that prompts a user to lubricate the die-set when the number of times counted by the counter unit exceeds a threshold value.

Further features of the present invention will become apparent from the following description of exemplary embodiments with reference to the attached drawings. Note, in the accompanying drawings, the same reference numerals are added for same or similar configuration elements.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A-5F depict views for explaining an example of screen transition of a lubrication request erasing screen displayed in the console unit in a case where a user erases the lubrication request display in the image forming apparatus according to the first embodiment.

FIG. 7 is a functional block diagram for explaining an example of a functional module configuration of the image forming apparatus according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
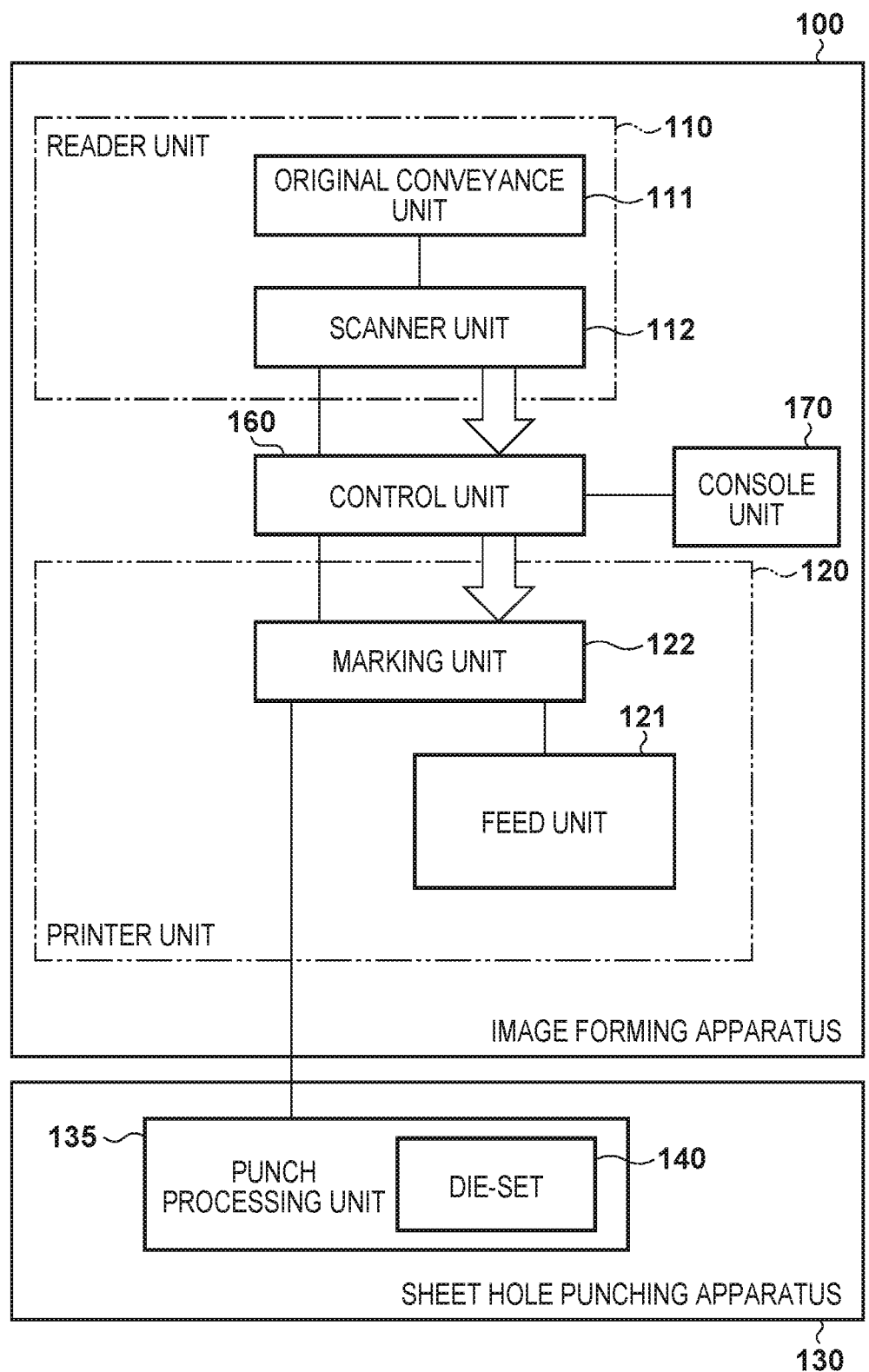
FIG. 1 is a block diagram for explaining a configuration of an image forming apparatus according to a first embodiment of the present invention.

FIG. 1 is a block diagram for explaining a configuration of an image forming apparatus 100 according to a first embodiment of the present invention.

The image forming apparatus 100 comprises a reader unit 110, a printer unit 120, a control unit 160, and a console unit 170. Also, the image forming apparatus 100 is connected electronically with a sheet hole punching apparatus 130. Note that the image forming apparatus 100 is not limited to a form in which it is connected with the sheet hole punching apparatus 130, and the image forming apparatus 100 may include the sheet hole punching apparatus 130.

The reader unit 110 comprises an original conveyance unit 111 for conveying an original, and a scanner unit 112 for reading an image on the original that is conveyed by the original conveyance unit 111. Image data read by the scanner unit 112 is input into the control unit 160.

The printer unit 120 comprises a feed unit 121 and a marking unit 122. The feed unit 121 includes a plurality of feed cassettes that respectively store recording sheets of differing sizes, and a manual feed tray on which special sheets such as an envelope or OHP or coated paper can be placed, and the feed unit 121 feeds recording sheets (sheets) from each feed cassette and the manual feed tray. The marking unit 122 is a unit that executes, for example, an image forming process by an electrophotographic method. Upon a copy operation, the marking unit 122 forms (prints) an image on a sheet that is fed from the feed unit 121 based on image data input via the control unit 160 from the scanner unit 112.

The control unit 160 is electronically connected to the reader unit 110 and the printer unit 120. The control unit 160 realizes a copy function by inputting image data generated by the reader unit 110 reading an original, and outputting the image data to the printer unit 120 to control so as to print an image on a sheet.

The console unit 170 comprises a display unit for displaying various keys for performing an input of an instruction to the control unit 160 and user interface screens, and the console unit 170 outputs to the control unit 160 by generating corresponding signals in accordance with various key operations.

The sheet hole punching apparatus 130 comprises a punch processing unit 135 and a die-set 140. The punch processing unit 135 applies a punch process to a sheet that is printed by the marking unit 122 and discharges to the outside of the apparatus. Also, the punch processing unit 135 is able to execute punch processes of differing numbers of punch holes, punch hole sizes and punch hole shapes by replacing the die-set 140.

Figure 2:
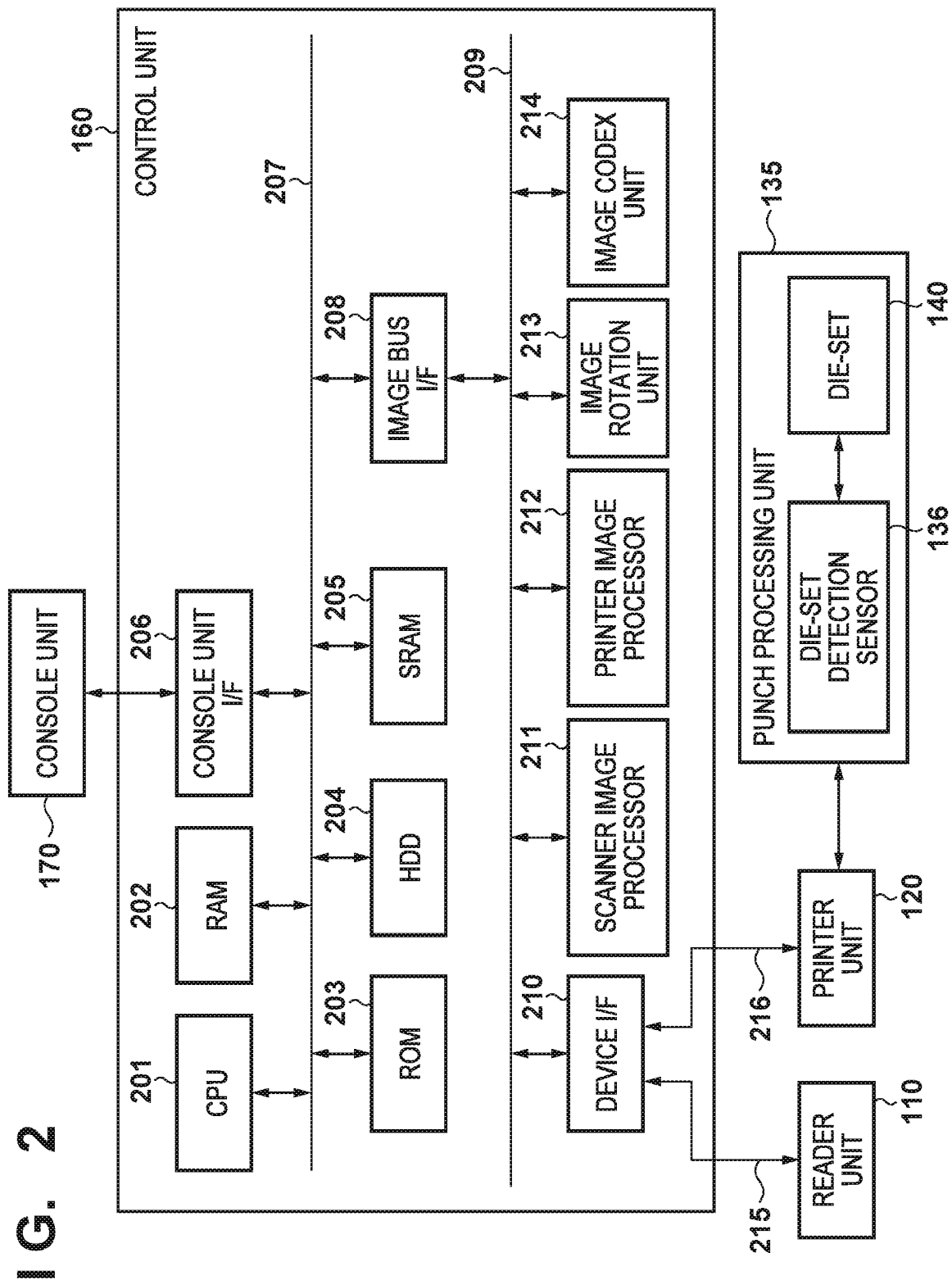
FIG. 2 is a block diagram for explaining a configuration of a control unit of the image forming apparatus according to the first embodiment.

Next, explanation is given for a detailed configuration of the control unit 160 with reference to FIG. 2.

FIG. 2 is a block diagram for explaining a configuration of the control unit 160 of the image forming apparatus 100 according to the first embodiment. Note that in FIG. 2, portions common to FIG. 1 are illustrated with the same reference numerals.

In the control unit 160, a CPU 201 controls the image forming apparatus 100 and the sheet hole punching apparatus 130. A RAM 202 is a system work memory for the CPU 201 to operate, and is an image memory for temporarily storing image data. A ROM 203 comprises a boot ROM, and stores a boot program. Also, a ROM-for-data of the ROM 203 is a non-volatile memory that can write and erase electronically stored content, and is, for example, an EEPROM, and can store various data that is explained later, or the like. A hard disk drive (HDD) 204 stores an OS, and software for control, and image data. A console unit I/F 206 is a unit that interfaces the console unit 170, and the console unit I/F 206 outputs to the console unit 170 the image data that should be displayed on the console unit 170, and transmits to the CPU 201 information that a user inputs via the console unit 170. An SRAM 205 is backed up by a battery, and is used by the CPU 201 for storing information desired to be held when a power supply of the apparatus is turned off. An image bus interface 208 is a bus bridge for controlling an interface between a system bus 207 and an image bus 209. These devices are arranged on the system bus 207.

A device I/F 210, a scanner image processor 211, a printer image processor 212, an image rotation unit 213, and an image codex unit 214 are arranged on the image bus 209.

The device I/F 210 is connected to the reader unit 110 and the printer unit 120, and converts image data for synchronous or non-synchronous systems. The scanner image processor 211 performs image processing such as noise reduction, shifting, masking/trimming, enlargement/reduction, tone conversion or the like in accordance with an instruction from the CPU 201 with respect to image data input from the reader unit 110. The printer image processor 212 performs image processing such as correction, resolution conversion, or the like, with respect to image data to be output to the printer unit 120. The image rotation unit 213 performs rotation processing with respect to image data. The image codex unit 214 performs JPEG compression/decompression processing for multi-valued image data, and performs compression/decompression processing such as that of JBIG, MMR, MR, MH or the like for binary image data.

Note that the CPU 201 comprehensively controls access between various devices connected to the system bus 207 based on control programs stored in a ROM-for-programs in the ROM 203 or the HDD 204. Also, the CPU 201 inputs image data from the reader unit 110 connected via a reader unit interface 215, and outputs an image signal as output information to the printer unit 120 connected via a printer unit interface 216. Display control procedures illustrated in later described FIG. 8A through FIG. 10 are realized by control programs stored in the ROM-for-programs of the ROM 203 or the HDD 204 being deployed into the RAM 202 and the CPU 201 processing based on the control programs.

In the punch processing unit 135, a die-set detection sensor 136 and the die-set 140 are comprised. The die-set detection sensor 136 is a sensor for detecting whether or not the die-set 140 is mounted. For example, the die-set detection sensor 136 is a transmissive optical sensor and when the die-set 140 is mounted, the optical sensor is disconnected by a protruding portion formed on a base of the die-set (not shown). Thereby, the die-set detection sensor 136 detects that the die-set 140 is mounted at a predetermined position, and notifies the CPU 201.

Figure 3:
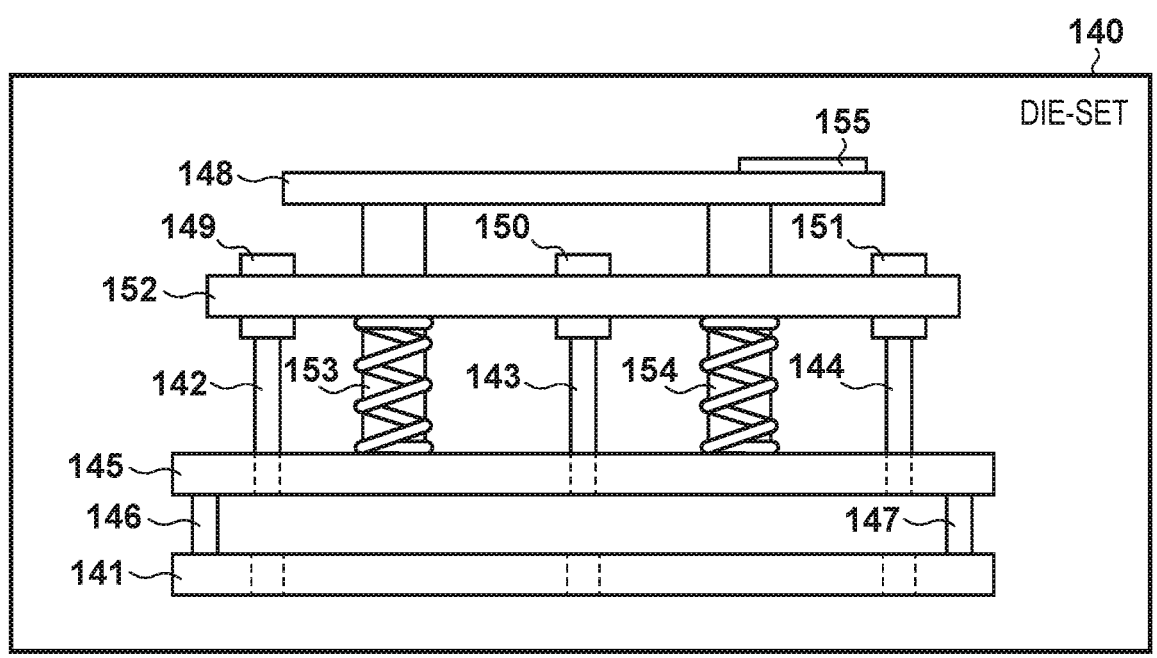
FIG. 3 is a diagram for explaining an example of a die-set that is mountable to a sheet hole punching apparatus according to the first embodiment.

Next, explanation is given of a detailed configuration of the die-set 140 with reference to FIG. 3.

FIG. 3 depicts a view for explaining an example of the die-set 140 that is mountable to the sheet hole punching apparatus 130 according to the first embodiment.

The die-set 140 is configured by a plurality of parts. As an example, a 3 hole die-set having 3 punch blades is explained in FIG. 3. A die 141 comprises punch holes that accommodate the leading edge portions of punch blades 142-144. A guide board 145 comprises holes respectively through which the punch blades 142-144 pass. The die 141 and the guide board 145 are connected by guide pins 146 and 147. A supporting member 148 supports the guide board 145. Each of the punch blades 142-144 is fixed to a holding board 152 by the corresponding punch holders 149-151. By a printed sheet being conveyed between the guide board 145 and the die 141, and the holding board 152 being pressed down, holes are opened in the sheet by the blade tips of the punch blades 142-144 fixed on the holding board 152. There are coil springs 153 and 154 between the holding board 152 and the guide board 145, and when the force pressing down the holding board 152 is released, the coil springs 153 and 154 return the holding board 152 to its original position.

Here by pouring an appropriate amount of lubricating oil on the leading edge portion of the punch blades 142-144, the degradation of the die-set can be prevented. Also, because the coil springs 153 and 154 that move vertically are also parts on which a large load is applied, degradation of the die-set can be prevented by pouring an appropriate amount of lubricating oil thereon.

An EEPROM 155 is installed in the die-set 140, and die-set information including a serial number of the die-set 140 and a die-set number are stored. Here, the serial number is identification information comprised by a 7-character string for identifying the die-set uniquely. Meanwhile, the die-set number is a number allocated to a die-set in order to distinguish the number of punch holes, the size of punch holes, and the shape of punch holes. When the die-set 140 is mounted to the punch processing unit 135, the CPU 201 is able to access the EEPROM 155.

When the die-set 140 is mounted to the punch processing unit 135, mounting of the die-set 140 is detected by the die-set detection sensor 136, and the CPU 201 obtains the serial number and the die-set number stored in the EEPROM 155 of the die-set 140.

Figure 4A:
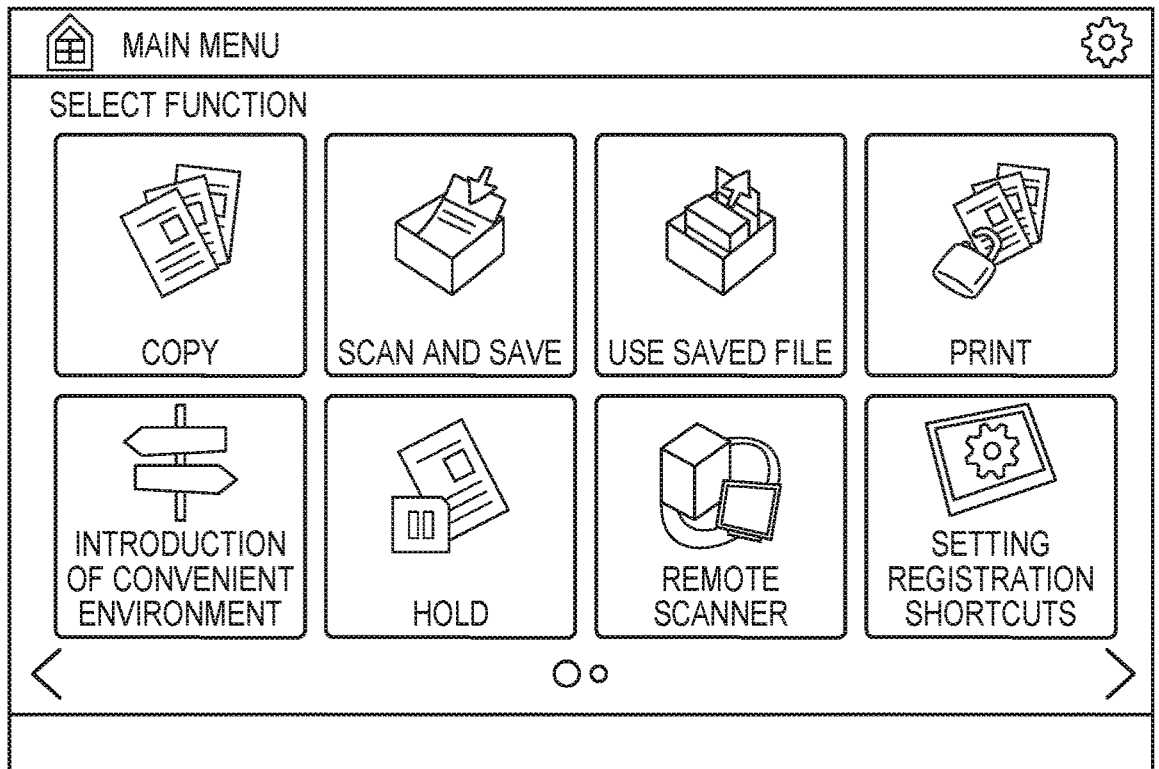
FIGS. 4A and 4B depict views for explaining an example of screen transition of a lubrication request display screen displayed in a console unit in a case where a user is prompted to perform lubrication work in the image forming apparatus according to the first embodiment.
Figure 4B:
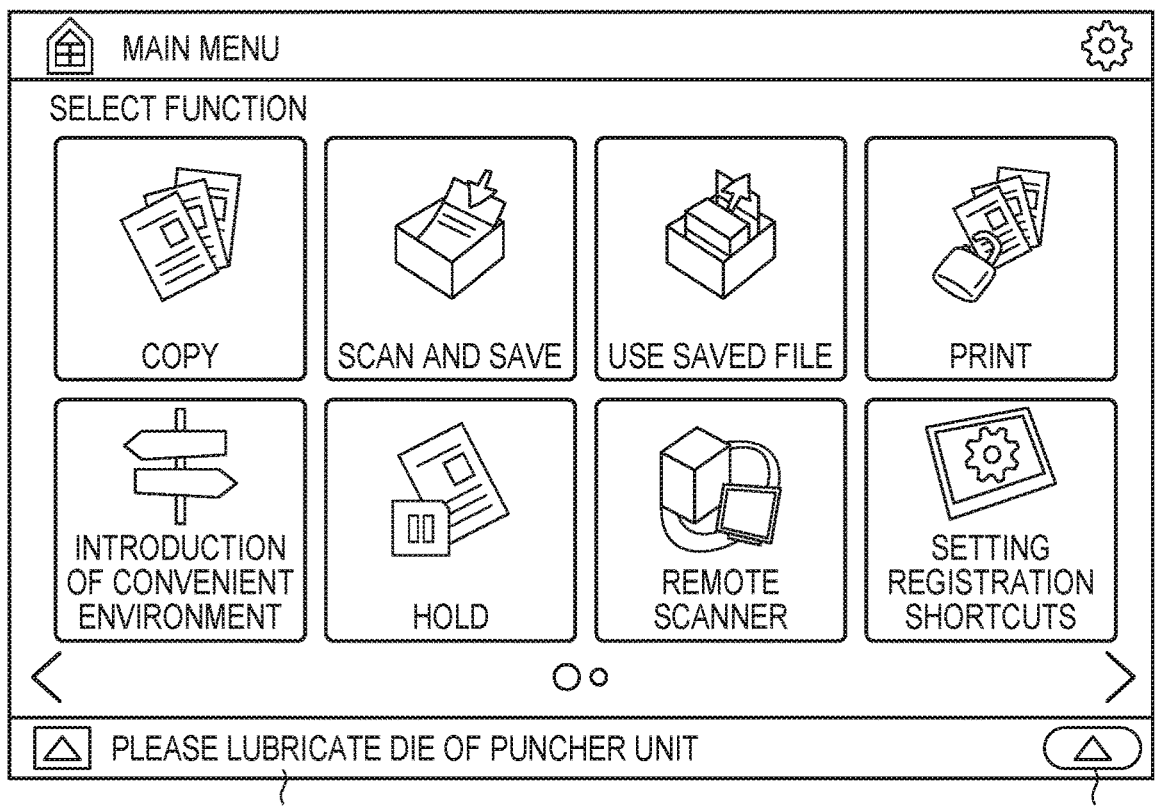

Next, with reference to FIGS. 4A and 4B, explanation is given for a procedure for displaying a request message for prompting a user to perform work of pouring lubricating oil on the die-set 140.

FIGS. 4A and 4B depict views for explaining an example of a screen transition of a lubrication request display that is displayed on the console unit 170 in a case where a user is prompted to perform lubrication work. Here, FIG. 4A depicts a view for illustrating a main menu screen prior to a lubrication request being generated, and FIG. 4B depicts a view for illustrating a main menu screen after the lubrication request is generated.

When a power supply of the image forming apparatus 100 is turned on, and the image forming apparatus 100 activates, the CPU 201 displays the main menu screen which is an initial screen illustrated in FIG. 4A, for example, on the console unit 170. Note that a bottommost line of the screen is reserved as a status display area 410 when not only the main menu screen but also other screens are displayed.

The CPU 201 displays a message to the status display area 410 when a situation that a user should know about occurs. If the CPU 201 determines that it is necessary that lubricating oil be poured onto the die-set 140, as is illustrated in FIG. 4B, the CPU 201 displays a request message 411 in the status display area 410, and displays a return process icon 412. Here, the request message 411 prompts the user to lubricate the die of the puncher unit. Also, the return process icon 412 is used to instruct to return to an original normal state after erasing the lubrication request display.

Next, with reference to FIGS. 5A through 5F, explanation is given for a procedure for erasing the request message 411 for prompting a user to perform work of pouring lubricating oil on the die-set 140.

FIGS. 5A-5F depict views for explaining an example of a screen transition of a lubrication request erasing screen displayed on the console unit 170 in a case where a user erases the lubrication request display.

Figure 5A:
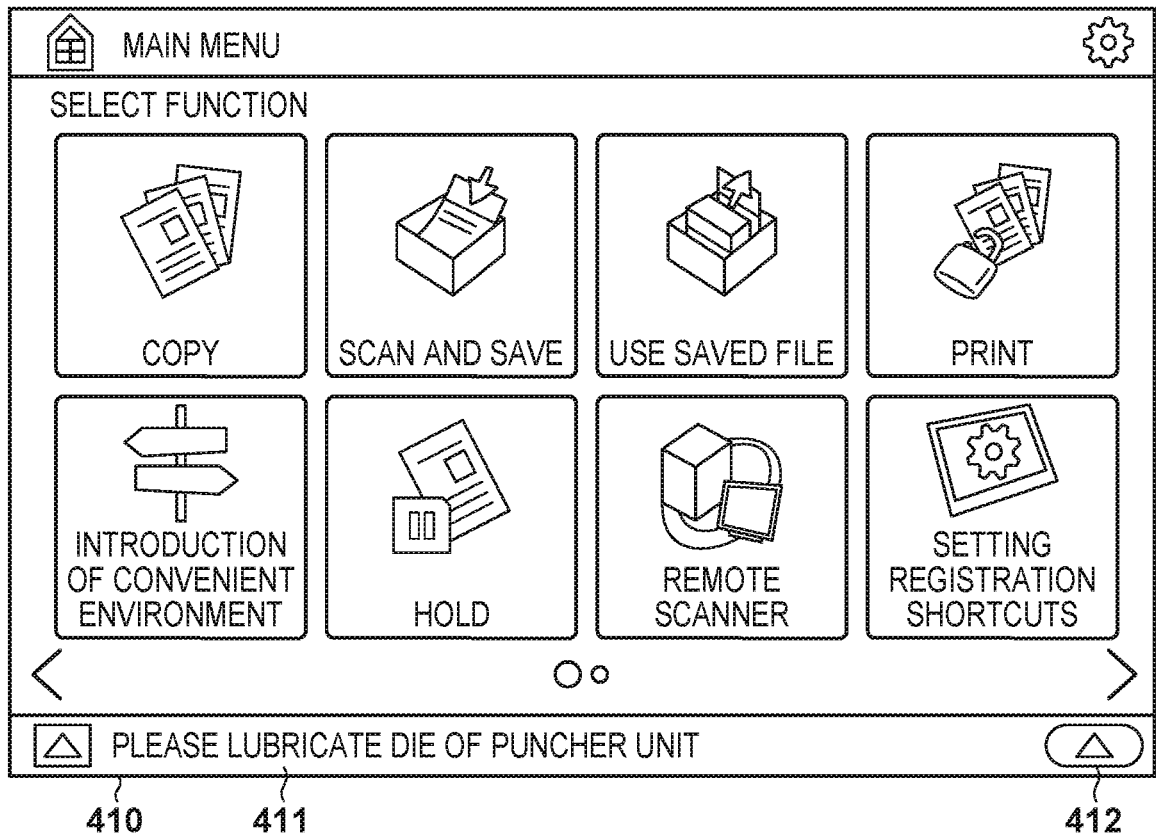

FIG. 5A illustrates an example of the main menu screen displayed on the console unit 170, and here, a case in which the CPU 201 determines that there is a need for lubricating oil to be poured onto the die-set 140 is illustrated; FIG. 5A corresponds to the screen of previously described FIG. 4B. Accordingly, in this screen, the request message 411 is displayed on the status display area 410, and the return process icon 412 is displayed.

Figure 5B:
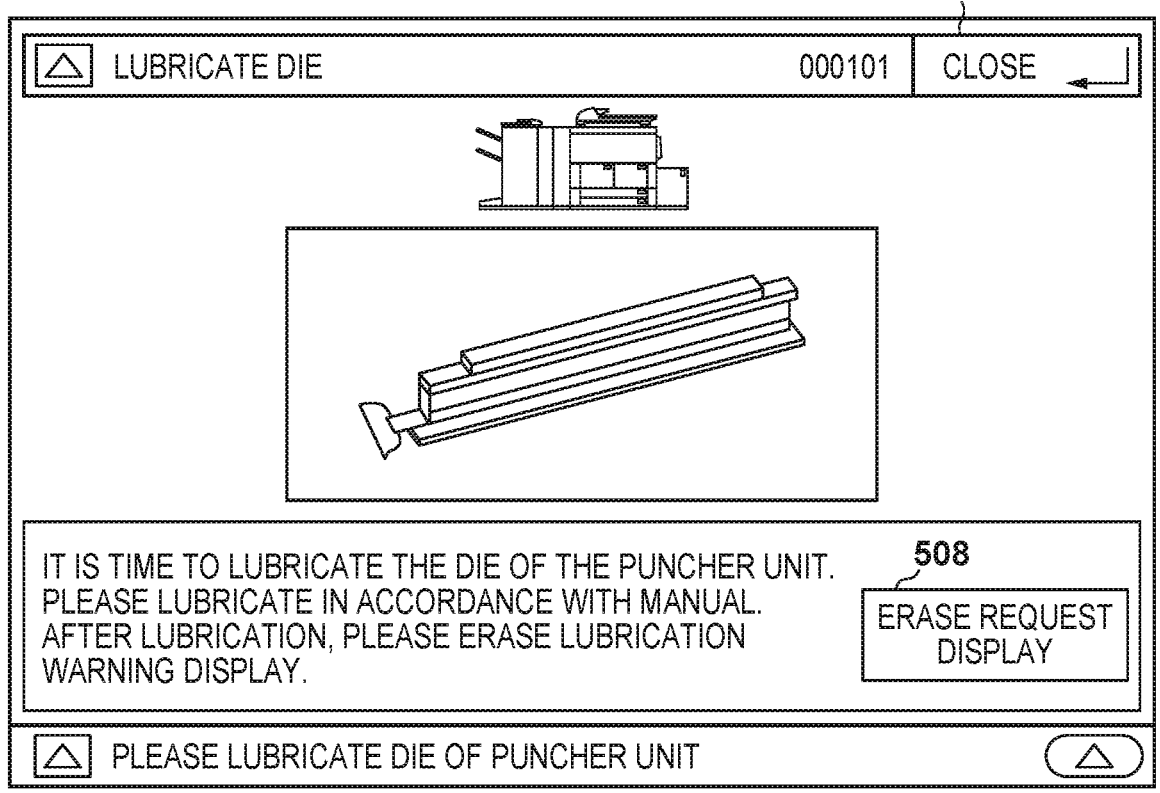

In the screen of FIG. 5A, when the CPU 201 detects that the return process icon 412 is pressed, the maintenance screen illustrated in FIG. 5B is displayed. In the screen of FIG. 5B, a "close" key 507 for causing the maintenance screen to be non-displayed is displayed. Also, in the screen of FIG. 5B, an "erase request display" key 508 for setting the request message 411 and the return process icon 412 to be non-displayed is displayed.

Figure 5C:
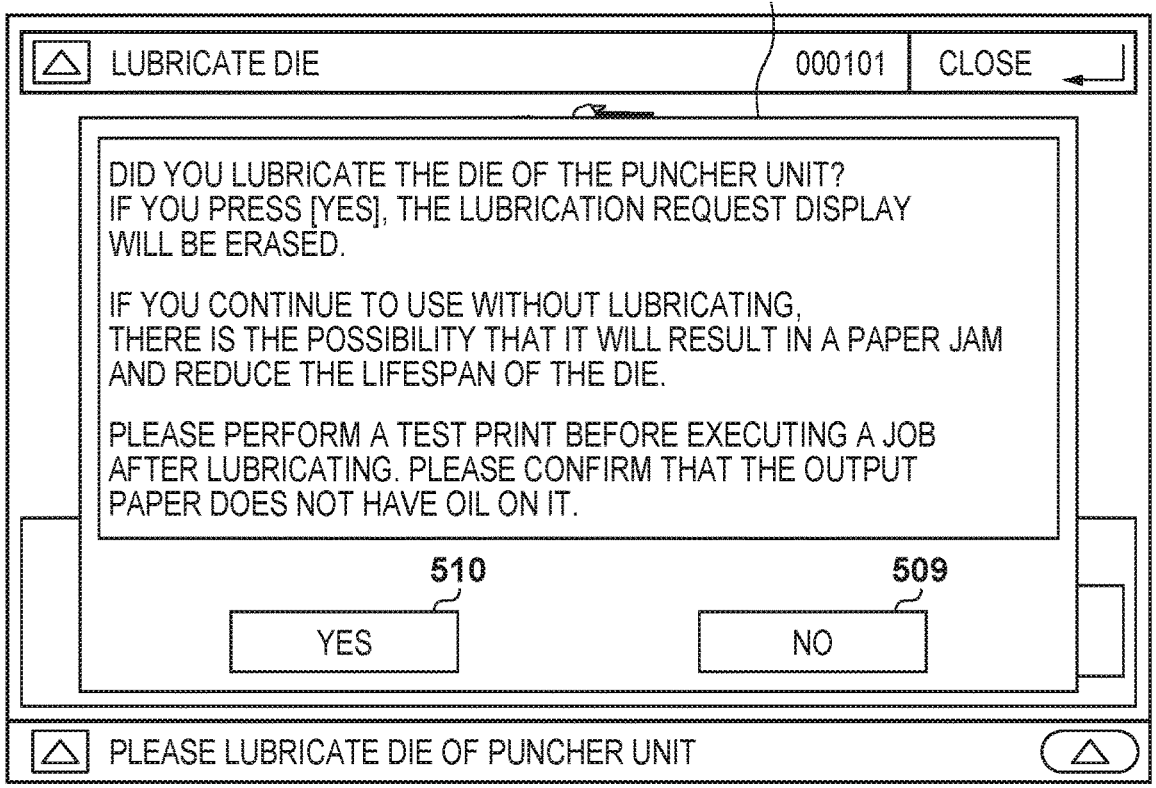
Figure 5D:
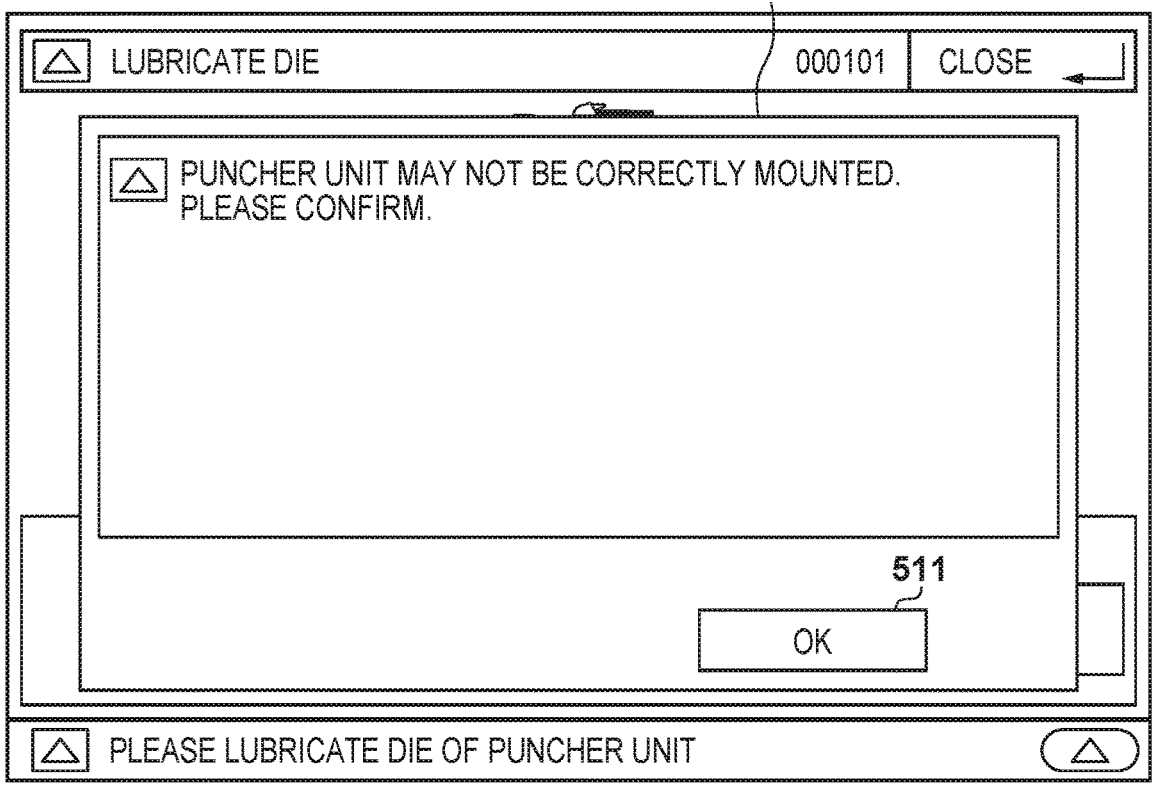

In the screen of FIG. 5B, when the CPU 201 detects that the "close" key 507 is pressed, the main menu screen illustrated in FIG. 5A is displayed. Meanwhile, in the screen of FIG. 5B, when the CPU 201 detects that the "erase request display" key 508 is pressed, a lubrication request erasing confirmation screen 503 illustrated in FIG. 5C is displayed. In the screen of FIG. 5C, when the CPU 201 detects that a "NO" key 509 is pressed, the maintenance screen illustrated in FIG. 5B is displayed. On the other hand, when the CPU 201 detects that a "YES" key 510 is pressed in the screen of FIG. 5C, it discriminates whether or not the die-set 140 is mounted by the die-set detection sensor 136 in response to that. Also, when the CPU 201 discriminates that the die-set 140 is not mounted, the CPU 201 displays a die-set not mounted error screen 504 illustrated in FIG. 5D. Meanwhile, in the screen of FIG. 5D, when the CPU 201 detects that an "OK" key 511 is pressed, the lubrication request erasing confirmation screen 503 illustrated in FIG. 5C is displayed. Note that the screen of FIG. 5D is displayed because there are cases in which the die-set 140 is not mounted normally due to the lubrication to the die-set 140, and this screen is displayed when the die-set detection sensor 136 detects whether or not the die-set 140 is mounted and an abnormality is detected.

Meanwhile, when the "erase request display" key 508 is pressed in the screen of FIG. 5B, and the CPU 201 discriminates that the die-set 140 is mounted, the CPU 201 displays a lubrication request erasing completion screen 505 illustrated in FIG. 5E. Then after that, the main menu screen illustrated in FIG. 5F is displayed. The screen illustrated in FIG. 5F is similar to the screen of FIG. 4A, and the request message 411 and the return process icon 412 are not displayed in the status display area 410.

Next, with reference to FIGS. 6A-6D, explanation is given for a procedure in which a lubrication work is completed prior to the request message being displayed to prompt a user to perform work of pouring lubricating oil on the die-set 140.

FIGS. 6A through 6D depict views for illustrating an example of a screen transition of a post-lubrication initialization screen displayed on the console unit 170 in a case where a user executes an initialization after the lubrication work completes.

Figure 6A:
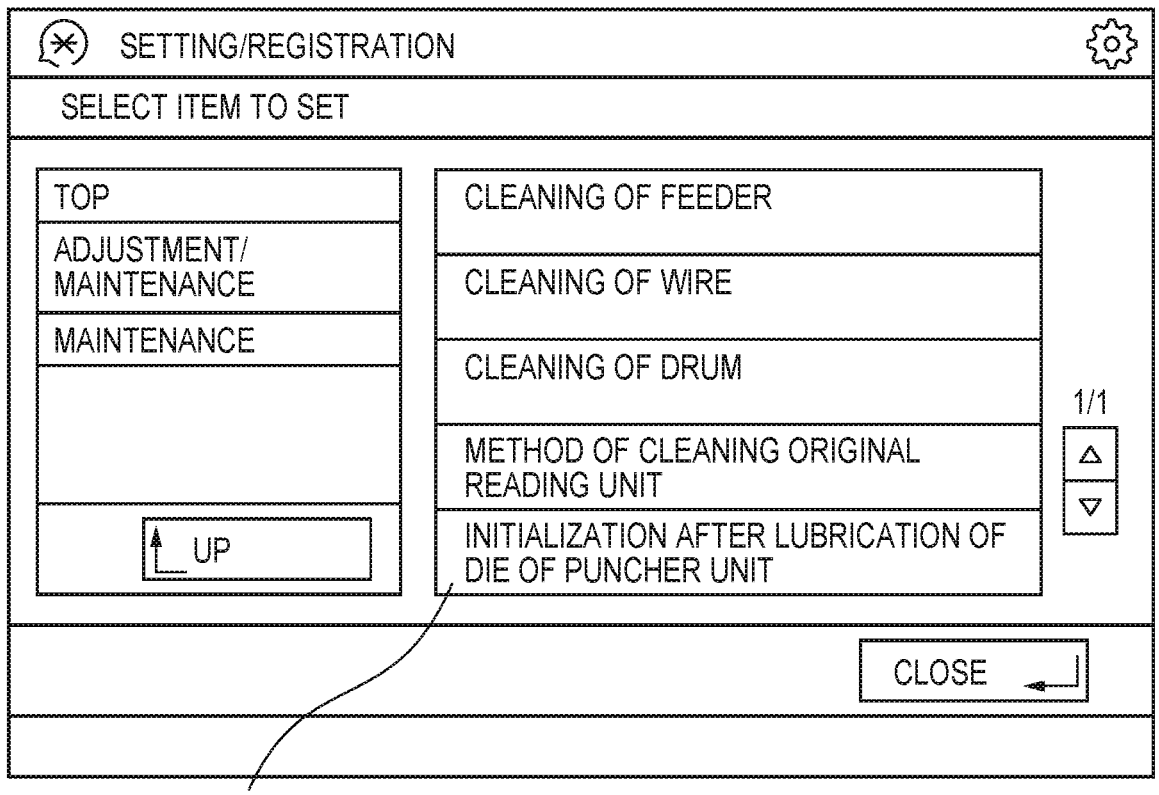
FIGS. 6A-6D depict views for explaining an example of screen transition of a post-lubrication initialization screen displayed in the console unit in a case where a user executes an initialization after lubrication work is completed in the image forming apparatus according to the first embodiment.

The user causes a setting/registration screen as is illustrated in FIG. 6A to be displayed on the console unit 170 by operating the console unit 170. In the screen of FIG. 6A, when the CPU 201 detects that a menu item 605 for initialization after lubrication of the die of the puncher unit is selected, the CPU 201 displays a post-lubrication initialization confirmation screen 602 illustrated in FIG. 6B. A screen of FIG. 6B is displayed for querying the user as to whether or not lubrication work on the die of the puncher unit is complete.

Figure 6B:
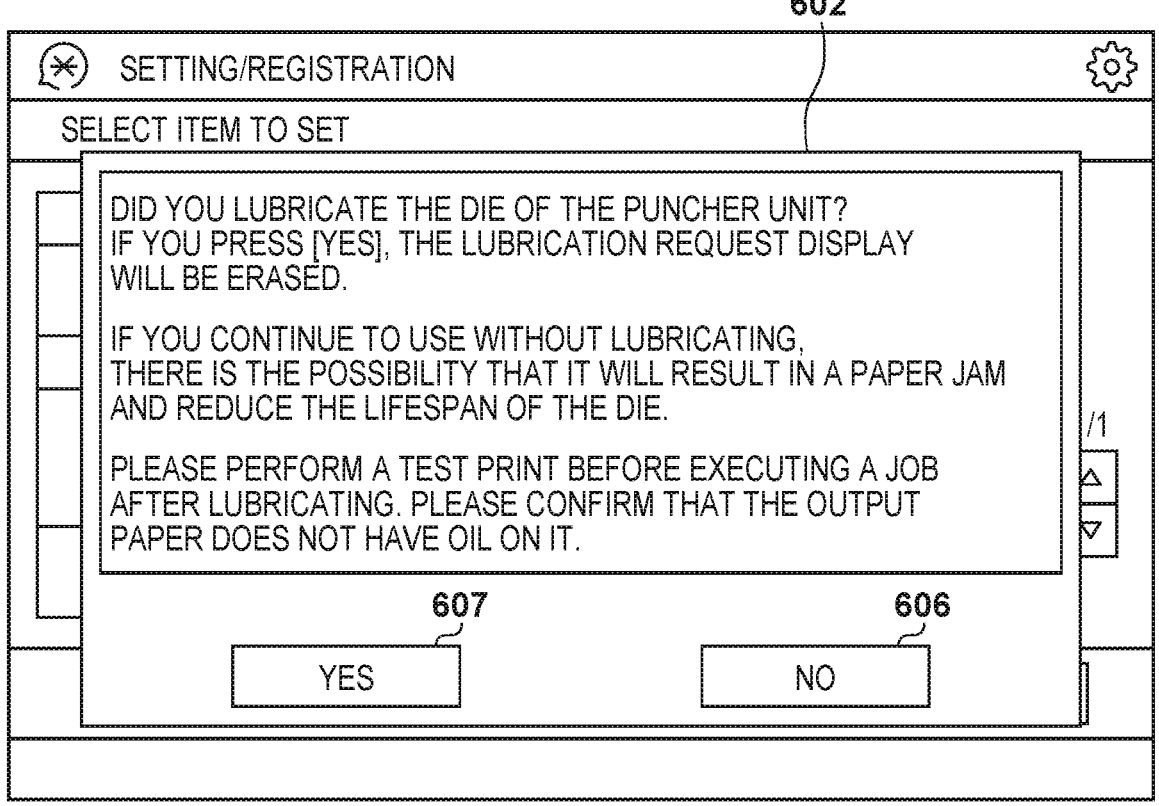
Figure 6C:
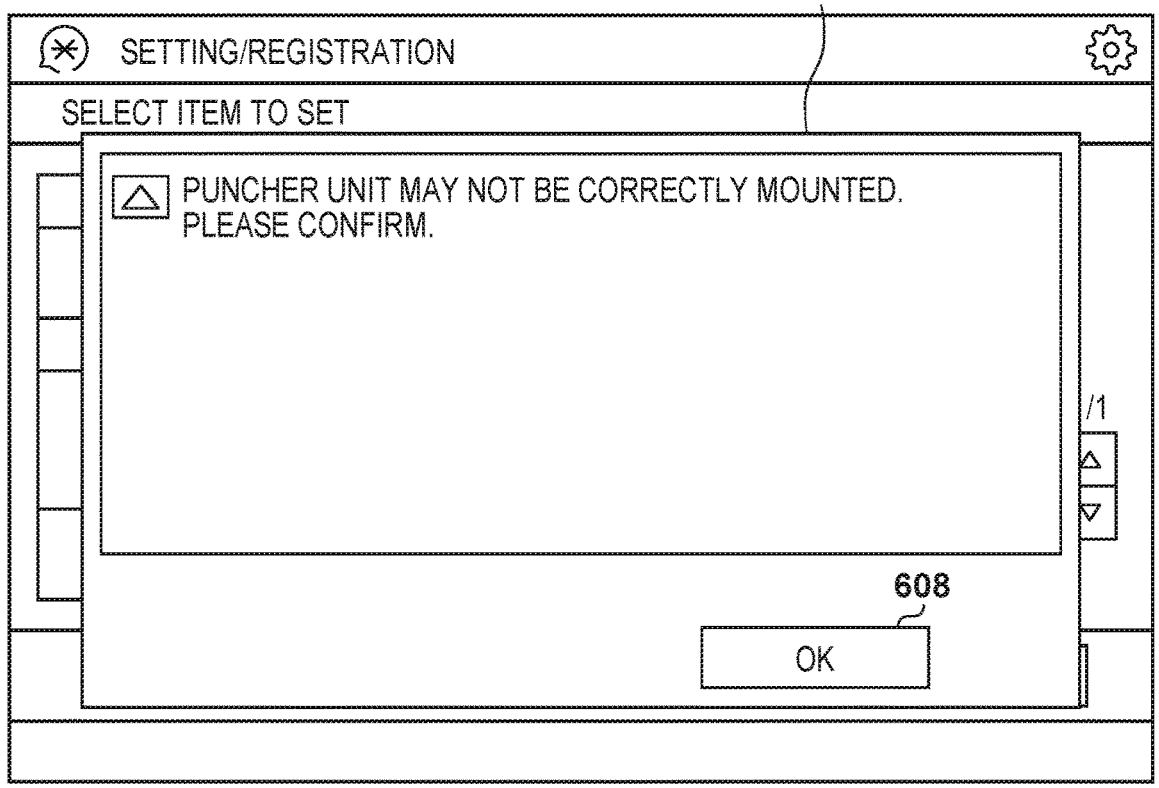

In the screen of FIG. 6B, when the CPU 201 detects that a "NO" key 606 is pressed, a setting/registration screen illustrated in FIG. 6A is displayed. On the other hand, when the CPU 201 detects that a "YES" key 607 is pressed in the screen of FIG. 6B, the CPU 201 determines whether or not the die-set 140 is mounted by the die-set detection sensor 136. Also, if the CPU 201 determines that the die-set 140 is not mounted, the CPU 201 displays a die-set not mounted error screen 603 illustrated in FIG. 6C. In the screen of FIG. 6C, when the CPU 201 detects that an "OK" key 608 is pressed, the post-lubrication initialization confirmation screen 602 illustrated in FIG. 6B is displayed.

Figure 6D:
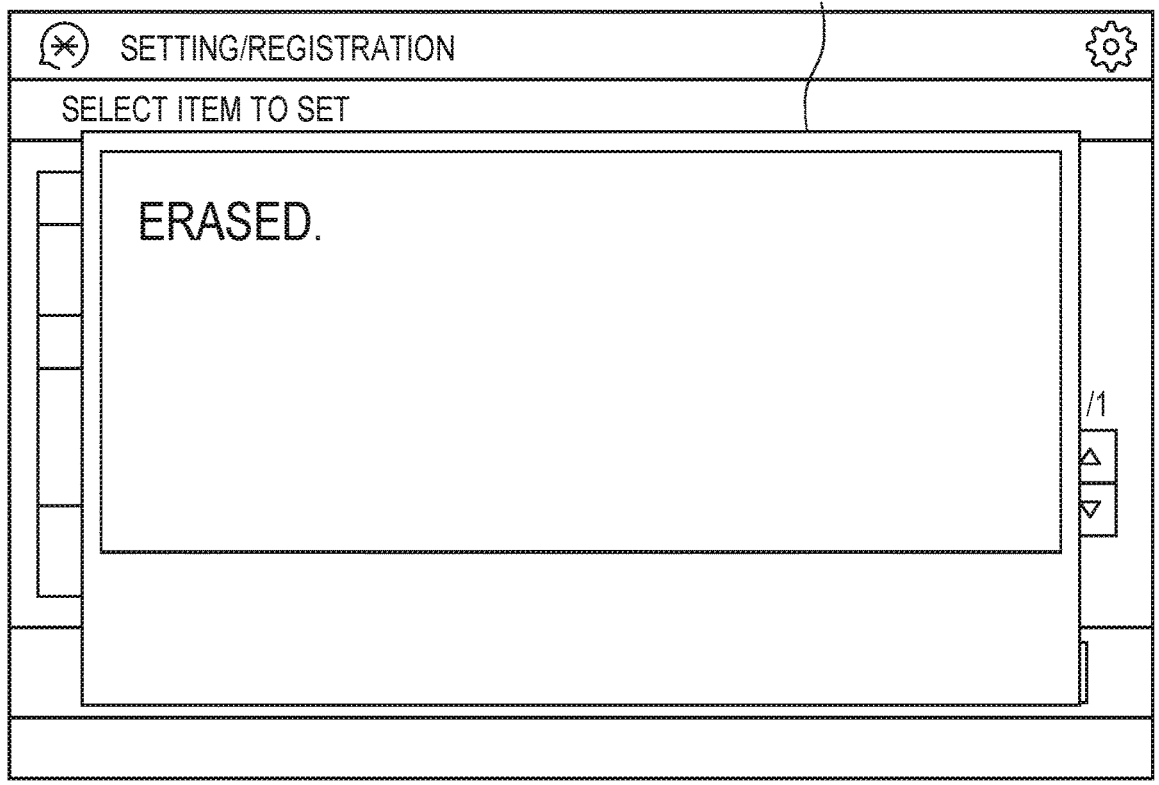

Meanwhile, when the CPU 201 detects that the "YES" key 607 is pressed in the screen of FIG. 6B, and the CPU 201 discriminates that the die-set 140 is mounted, the CPU 201 displays an initialization completion screen 604 as shown in FIG. 6D. Then after that, the setting/registration screen illustrated in FIG. 6A is displayed.

FIG. 7 is a functional block diagram for explaining an example of a functional module configuration of the image forming apparatus 100 according to the first embodiment of the present invention. Note that each functional module illustrated in FIG. 7 is a program module that is realized by a program deployed from the ROM 203 or the HDD 204 into the RAM 202 being executed by the CPU 201.

A die-set mount detection module 701 determines whether or not the die-set 140 is mounted in accordance with a die-set mount detection signal received from the die-set detection sensor 136. Also, the die-set mount detection module 701 displays the die-set not mounted error screen 504 or 603 illustrated in FIG. 5D or FIG. 6C on the console unit 170 by a display module 708.

A die-set identification module 702 identifies a die-set in accordance with a serial number and a die-set number read from the EEPROM 155 of the die-set 140.

A punch process count module 703 counts the number of times that the punch process is applied by the sheet hole punching apparatus 130 using the die-set 140.

A die-set attribute management module 704 stores the number of times that the punch process is counted by the punch process count module 703 in association with a serial number and a die-set number detected by the die-set identification module 702, in the SRAM 205 as a die-set attribute 705. Also, the die-set attribute management module 704 obtains the number of times that the punch process corresponding to the serial number detected by the die-set identification module 702 is executed from the die-set attribute 705. Also, the die-set attribute management module 704, if a user erases the lubrication request display in the procedure illustrated in FIGS. 5A-5E, initializes the number of times that the punch process corresponding to the serial number detected by the die-set identification module 702 has been executed, which is stored in the SRAM 205 as the die-set attribute 705. Also, if a user executes an initialization after completing the lubrication work in the procedure illustrated in FIGS. 6A-6D, the number of times that the punch process corresponding to the serial number detected by the die-set identification module 702 has been executed, which is stored in the SRAM 205 as the die-set attribute 705, is initialized.

Here, the die-set number is assigned to distinguish the number, size and shape of the punch hole according to the die-set. Also, in association with the die-set number, a threshold value for the number of times that the punch process is executed for prompting a user to perform work to lubricate the die-set 140 is stored in the SRAM 205 as an oiling count threshold table 706.

A lubrication request display determination module 707 compares the number of times that the punch process corresponding to the die-set number has been executed which is obtained from the oiling count threshold table 706 and the number of times that the punch process corresponding to the serial number has been executed which is obtained from the die-set attribute 705, and determines whether or not to display a request message. Then, the lubrication request display determination module 707 displays on the console unit 170, by the display module 708, a request message for prompting a user to perform work to pour lubricating oil onto the die-set 140.

Figure 8A:
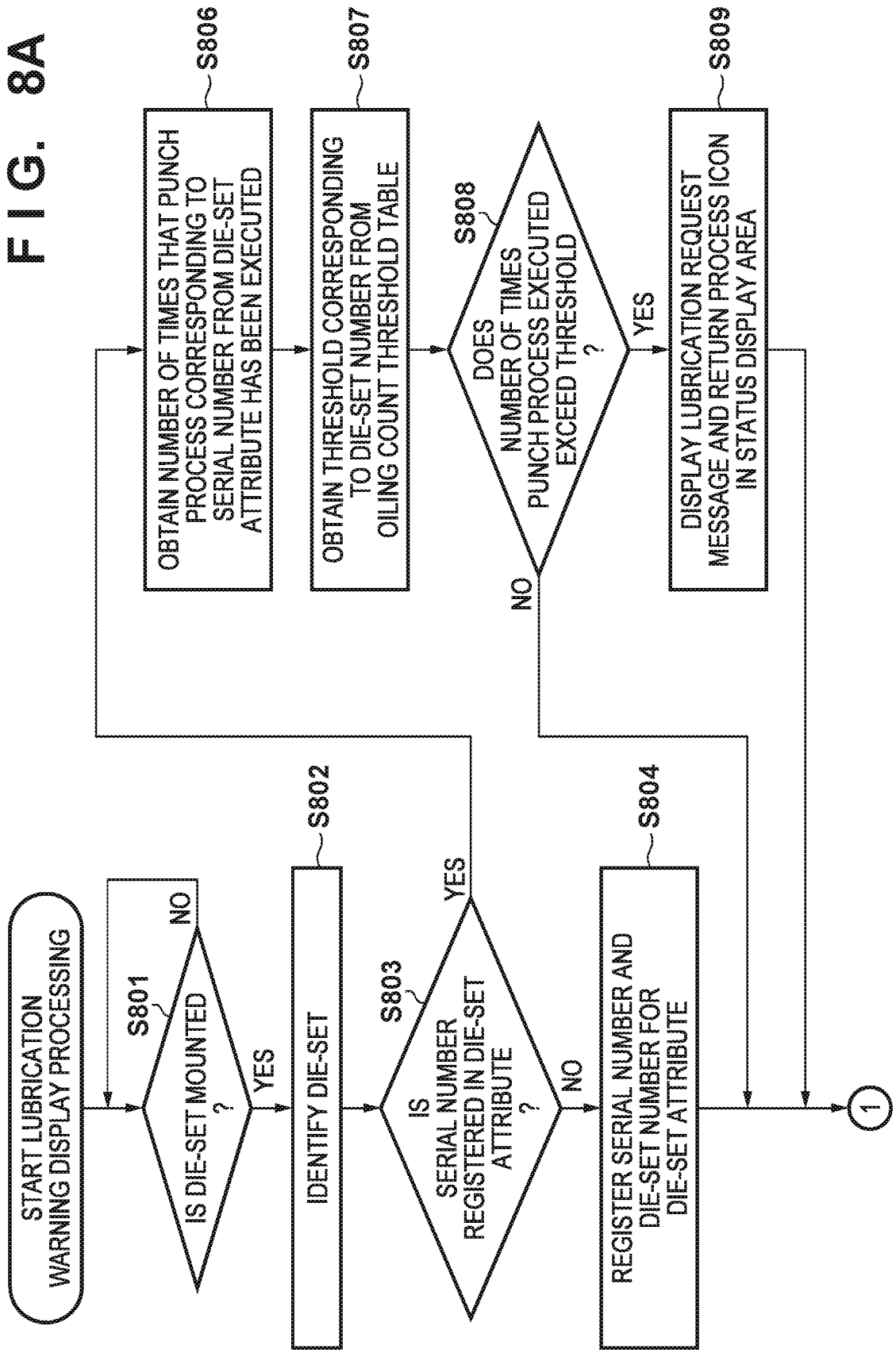
FIGS. 8A and 8B are flowcharts for describing processing for displaying a lubrication request by the image forming apparatus according to the first embodiment.
Figure 8B:
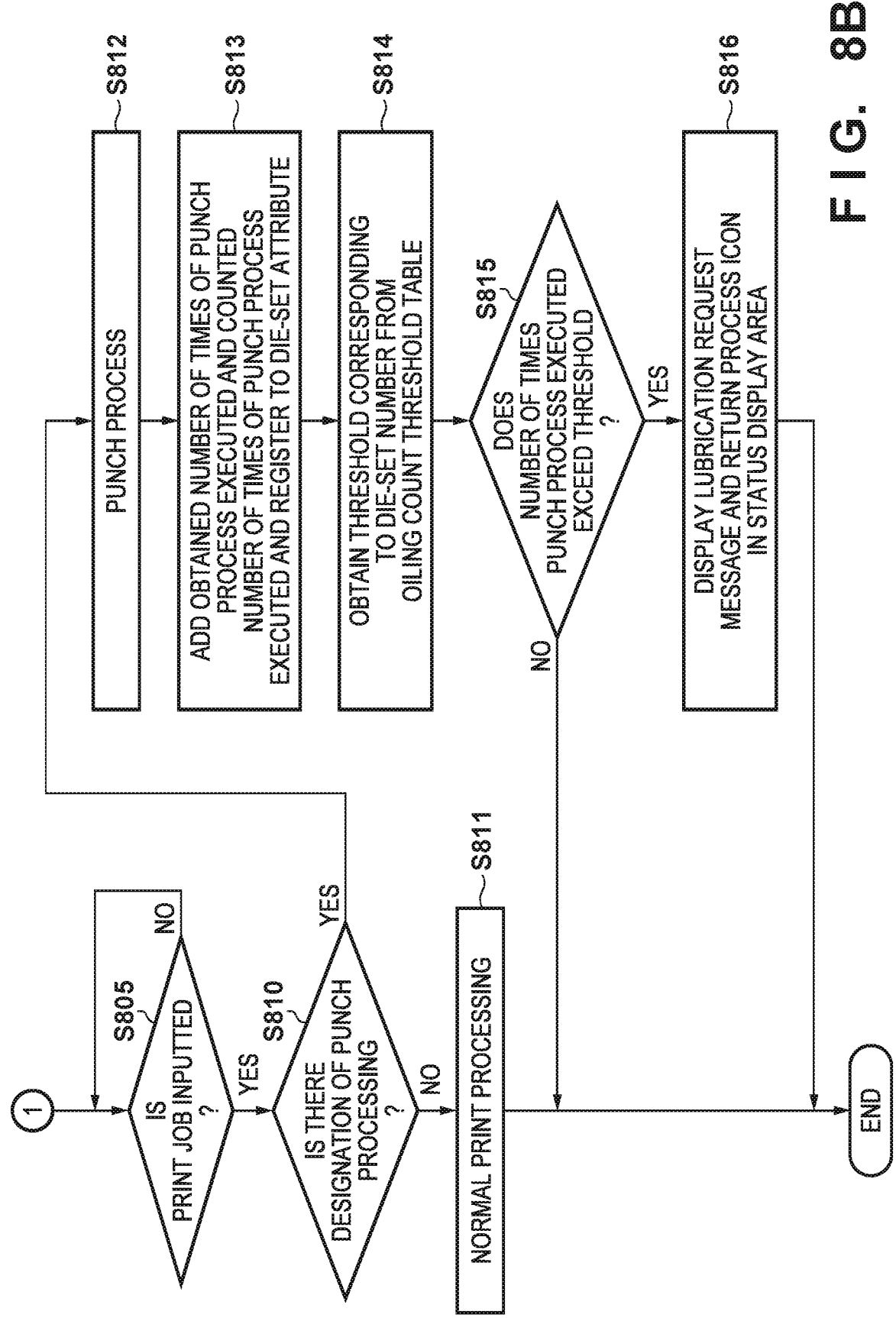

FIGS. 8A and 8B are flowcharts for describing processing for displaying a lubrication request by the image forming apparatus 100 according to the first embodiment of the present invention. By the CPU 201 deploying a control program stored in the ROM-for-programs in the ROM 203 or the HDD 204 into the RAM 202 and executing the control program, each step illustrated in the flowchart of FIGS. 8A and 8B is executed.

Firstly, in step S801, the CPU 201, functioning as the die-set mount detection module 701, determines whether or not the die-set 140 is mounted to the punch processing unit 135. When it is determined, in step S801, that the die-set 140 is mounted, the CPU 201 advances the processing to step S802. In step S802, the CPU 201, functioning as the die-set identification module 702, identifies the die-set 140 based on a die-set number and a serial number read from the EEPROM 155 of the die-set 140, and advances the processing to step S803. In step S803, the CPU 201 determines whether or not the serial number of the die-set 140 identified in step S802 is registered in the die-set attribute 705 stored in the SRAM 205. If, in step S803, the CPU 201 determines that the serial number corresponding to the die-set attribute 705 is not registered, the processing proceeds to step S804, and if the CPU 201 determines that the serial number is registered, the processing advances to step S806. In step S804, the CPU 201, functioning as the die-set attribute management module 704, stores the die-set number and the serial number read from the EEPROM 155 of the die-set 140 in the SRAM 205 as the die-set attribute 705. Also, at this time, the number of times that the punch process corresponding to the serial number is executed is initialized and registered to the die-set attribute 705, and the processing advances to step S805 (FIG. 8B). With this, when a new die-set 140 is mounted, the die-set 140 is registered to the die-set attribute 705.

Meanwhile, in step S806, the CPU 201, functioning as the die-set attribute management module 704, obtains from the die-set attribute 705 the number of times that the punch process corresponding to the serial number read from the EEPROM 155 of the die-set 140 has been executed, and the processing advances to step S807. In step S807, the CPU 201, functioning as the lubrication request display determination module 707, obtains from the oiling count threshold table 706 the threshold value for the number of times that the punch process corresponding to the die-set number read from the EEPROM 155 of the die-set 140 has been executed, and the processing advances to step S808. The CPU 201, in step S808, determines whether or not the number of times that the punch process corresponding to the serial number has been executed which is obtained from the die-set attribute 705 exceeds the threshold value of the number of times that the punch process corresponding to the die-set number has been executed which is obtained from the oiling count threshold table 706. If it is determined that the threshold value is exceeded, the processing proceeds to step S809, and if it is determined that the threshold value is not exceeded, the processing advances to step S805. In step S809, the CPU 201 functions as the display module 708, and as is illustrated in FIG. 4B, the request message 411 and the return process icon 412 are displayed on the status display area 410 of the menu screen, and the processing advances to step S805.

By this processing, when it is determined that the number of times that the punch process has been executed by the die-set 140 exceeds the threshold value of the oiling count threshold table 706, the request message can be displayed to the user so that the die-set 140 is lubricated.

The processing proceeds to step S805, and the CPU 201 determines whether or not a print job is inputted, and if the CPU 201 determines that the print job is inputted, the processing advances to step S810. In step S810, the CPU 201 determines whether or not the punch process is designated for the inputted print job, and when it is determined that the punch process is not designated in the job, the processing proceeds to step S811, the CPU 201 executes normal print processing, and this processing terminates.

Meanwhile, in step S810, if the CPU 201 determines that the print job designates the punch process, the processing advances to step S812. In step S812, the CPU 201 executes the punch process by the sheet hole punching apparatus 130 using the die-set 140, and the processing advances to step S813. At this point, the punch process count module 703 counts the number of times the punch process has been executed in step S812. In step S813, the CPU 201 adds the number of times that the punch process corresponding to the serial number of the die-set 140 has been executed which is obtained from the die-set attribute 705 and the number of times that the punch process has been executed which is counted by the punch process count module 703. Then, the CPU 201, functioning as the die-set attribute management module 704, stores the added up number of times that the punch process has been executed in the SRAM as the die-set attribute 705, and the processing advances to step S814. In step S814, the CPU 201, similarly to in step S807, obtains the threshold value for the number of times that the punch process corresponding to the die-set number of the die-set 140 has been executed from the oiling count threshold table 706 of the SRAM 205 by the lubrication request display determination module 707, and the processing advances to step S815. In step S815, the CPU 201, similarly to in step S808, determines whether or not the number of times that the punch process has been executed for that die-set 140 exceeds the threshold value for the number of times that the punch process has been executed which is obtained from the oiling count threshold table 706. Here, if the CPU 201 determines that the threshold value is exceeded, the processing proceeds to step S816, and as is illustrated in FIG. 4B, for example, the request message 411 and the return process icon 412 are displayed on the status display area 410, and this processing terminates. Meanwhile, if the CPU 201, in step S815, determines that the threshold value is not exceeded, the processing terminates as is.

By this processing, if the number of times that the punch process has been executed by the die-set 140, due to the punch process being executed, exceeds the threshold value of the oiling count threshold table 706, it is possible to display a request message to a user so that the die-set 140 is lubricated.

Figure 9:
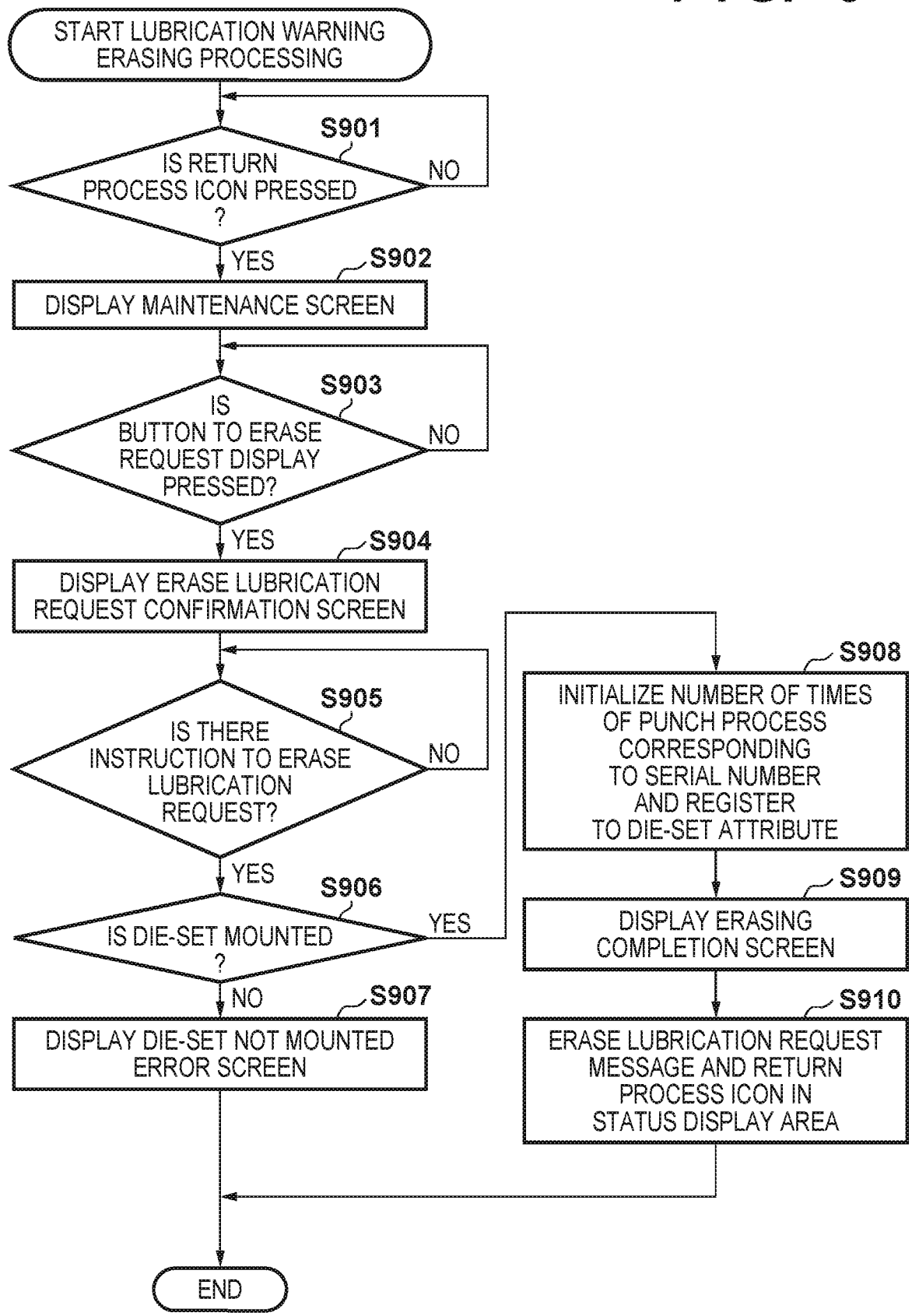
FIG. 9 is a flowchart for describing processing for erasing a lubrication request by the image forming apparatus according to the first embodiment.

FIG. 9 is a flowchart for describing processing for erasing a lubrication request by the image forming apparatus 100 according to the first embodiment of the present invention. By the CPU 201 deploying a control program stored in the ROM-for-programs in the ROM 203 or the HDD 204 into the RAM 202 and executing the control program, each step illustrated in the flowchart of FIG. 9 is executed.

Firstly, in step S901, the CPU 201 determine whether or not the return process icon 412 is pressed by a user in a state in which the screen illustrated in FIG. 4B or FIG. 5A is displayed. If the CPU 201 determines that the return process icon 412 is pressed, the processing advances to step S902 from step S901. In step S902, the CPU 201 displays on the console unit 170 a maintenance screen as is illustrated in FIG. 5B, for example, and the processing advances to step S903. In step S903, the CPU 201 determines whether or not the user pressed the "erase request display" key 508 in the screen of FIG. 5B. Here, if it is determined that the "erase request display" key 508 is pressed, the processing advances to step S904 from step S903. In step S904, the CPU 201 displays on the console unit 170 the lubrication request erasing confirmation screen 503 as is illustrated in FIG. 5C, for example, and the processing advances to step S905. In step S905, the CPU 201 determines whether or not it is instructed that the lubrication request display be erased by the "YES" key 510 being pressed on the screen of FIG. 5C. If it is determined that the "YES" key 510 is pressed, the processing advances to step S906 from step S905. In step S906, the CPU 201, functioning as the die-set mount detection module 701, determines whether or not the die-set 140 is mounted to the punch processing unit 135. If the CPU 201, in step S906, determines that the die-set 140 is not mounted, the processing proceeds to step S907, and the CPU 201, for example, displays the die-set not mounted error screen 504 illustrated in FIG. 5D on the console unit 170, and this processing terminates.

Meanwhile, if the CPU 201, in step S906, determines that the die-set 140 is mounted, the processing advances to step S908. In step S908, the CPU 201, functioning as the die-set attribute management module 704, initializes the number of times that the punch process corresponding to the serial number read from the EEPROM 155 of the die-set 140 has been executed. Then, the CPU 201, functioning as the die-set attribute management module 704, registers the initialized number of times that the punch process has been executed to the die-set attribute 705, and the processing advances to step S909. In step S909, the CPU 201 displays on the console unit 170 the lubrication request erasing completion screen 505 as illustrated in FIG. 5E, for example, and the processing advances to step S910. In step S910, the CPU 201 sets the request message 411 and the return process icon 412 that are displayed in the status display area 410 as shown in FIG. 5F, for example, to be non-displayed, and this processing terminates.

By this processing, a user can clear the request message 411 and the return process icon 412 displayed on the screen of FIG. 4B or FIG. 5A after lubricating the die-set 140 of the punch processing unit 135. Also, in addition to erasing the message and icon (button), the number of times that the punch process has been executed by that die-set can be initialized.

Figure 10:
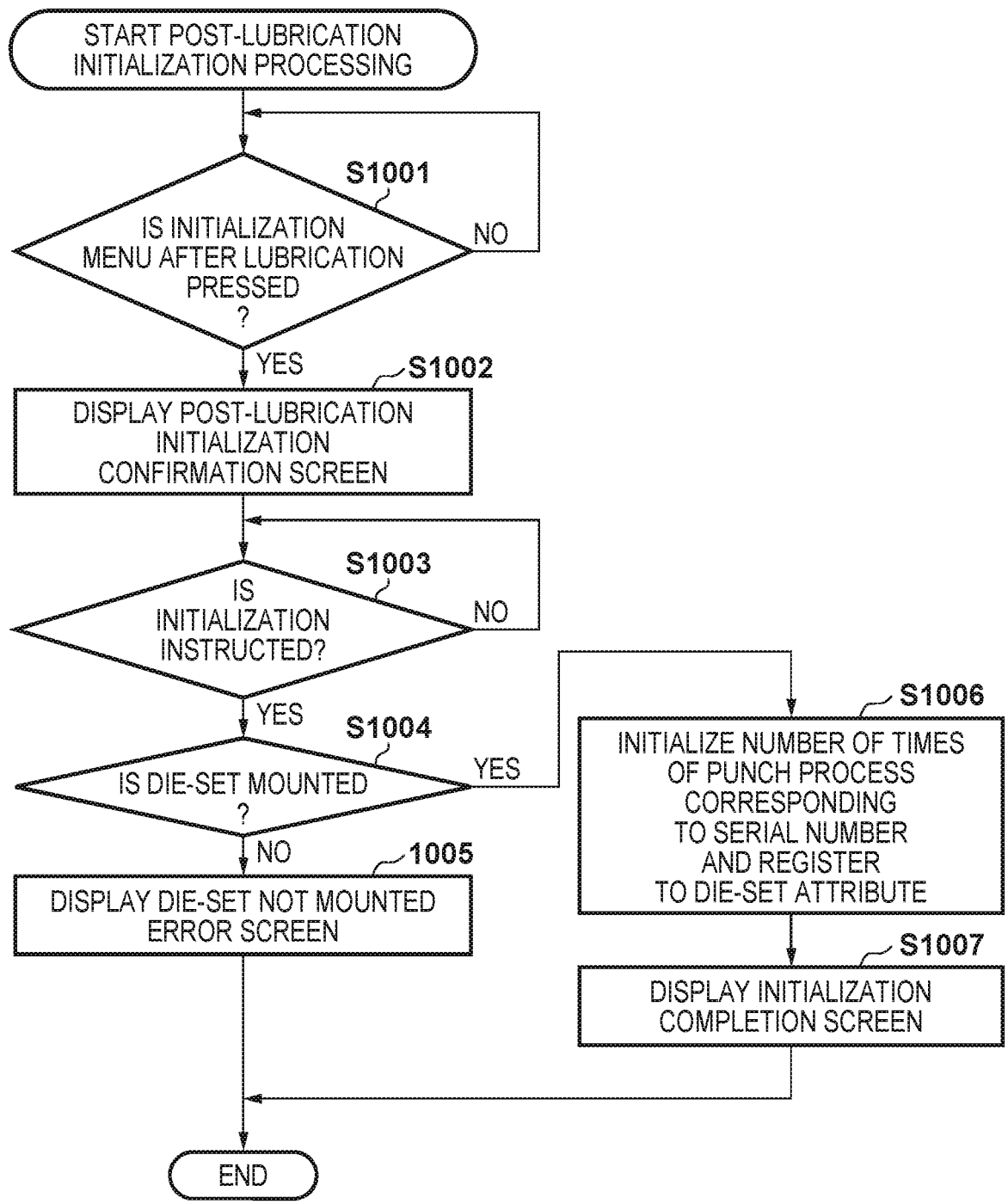
FIG. 10 is a flowchart for describing post-lubrication initialization processing by the image forming apparatus according to the first embodiment.

FIG. 10 is a flowchart for describing post-lubrication initialization processing by the image forming apparatus 100 according to a first embodiment of the present invention. By the CPU 201 deploying a control program stored in the ROM-for-programs in the ROM 203 or the HDD 204 into the RAM 202 and executing the control program, each step illustrated in the flowchart of FIG. 10 is executed.

Firstly, the CPU 201, in step S1001, displays the screen of FIG. 6A, for example, and determines whether or not the menu item 605 for initialization after lubrication of the die of the puncher unit is selected on the screen. If it is determined that the menu item 605 for initialization after lubrication of the die of the puncher unit is selected, the processing advances to step S1002 from step S1001. In step S1002, the CPU 201 displays on the console unit 170 the post-lubrication initialization confirmation screen 602 as shown in FIG. 6B, for example, and the processing advances to step S1003. In step S1003, the CPU 201 determines whether or not the post-lubrication initialization is instructed by the "YES" key 607 being pressed on the screen illustrated in FIG. 6B, for example. If the CPU 201 determines that post-lubrication initialization is instructed, the processing advances to step S1004 from step S1003. In step S1004, the CPU 201, functioning as the die-set mount detection module 701, determines whether or not the die-set 140 is mounted to the punch processing unit 135. Here, if it is determined that the die-set 140 is not mounted, the processing proceeds to step S1005, the CPU 201 displays the die-set not mounted error screen 603 as shown in FIG. 6C, for example, on the console unit 170, and this processing terminates.

Meanwhile, if the CPU 201, in step S1004, determines that the die-set 140 is mounted, the processing advances to step S1006. In step S1006, the CPU 201, functioning as the die-set attribute management module 704, initializes the number of times that the punch process corresponding to the serial number read from the EEPROM 155 of the die-set 140 has been executed. Then, the CPU 201, functioning as the die-set attribute management module 704, registers the initialized number of times that the punch process has been executed to the die-set attribute 705, and the processing advances to step S1007. In step S1007, the CPU 201 displays on the console unit 170 the initialization completion screen 604 as shown in FIG. 6D, for example, and the processing terminates.

As explained above, in accordance with this embodiments, it is possible to use a die-set until its original life span which is the usage limit is fulfilled. Also, it is possible to notify a user at the optimal timing for lubricating each die-set.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-037296, filed Feb. 26, 2015, which is hereby incorporated by reference herein in its entirety.

What is claimed is:

1. An image forming apparatus connected to a sheet hole punching apparatus that applies a punch process to a sheet received from the image forming apparatus, the sheet hole punching apparatus replaceably mounting a punch die-set for performing the punch process, the punch die-set having a first memory storing identification information for identifying the punch die-set, the image forming apparatus comprising:

a display configured to display information;

a controller configured to obtain the identification information from the first memory of the punch die-set mounted on the sheet hole punching apparatus; and a second memory configured to store count information indicating a number of times of execution of the punch process using the punch die-set mounted on the sheet hole punching apparatus in association with the identification information, wherein the controller causes the display to display a message for prompting a user to lubricate the punch die-set in accordance with the count information being greater than a predetermined value, wherein the controller causes the display to display a first input screen for causing the user to input first lubrication completion information indicating a completion of lubrication of the punch die-set in accordance with a predetermined operation by the user after having displayed the message, wherein in a case that a designation for displaying a second input screen for causing a user to input second lubrication completion information indicating a completion of lubrication of the punch die-set in accordance with an operation being different from the predetermined operation is input in a state that the count information is not greater than the predetermined value and a user has lubricated the punch die set before the message is displayed, the controller causes the display to display the second input screen, wherein the controller initializes the count information stored in the second memory in association with the identification information of the punch die-set based on an input of the first lubrication completion information via the first input screen, and wherein the controller initializes the count information stored in the second memory in association with the identification information of the punch die-set based on an input of the second lubrication completion information via the second input screen.

2. The image forming apparatus according to claim 1, wherein the controller obtains the identification information from the first memory of the punch die-set in accordance with having received a signal indicating that the punch die-set has been mounted on the sheet hole punching apparatus.

3. The image forming apparatus according to claim 1, further comprising a third memory configured to store the predetermined value in association with the identification information.

4. The image forming apparatus according to claim 1, wherein the controller further causes the display to display a button for inputting an erase instruction to erase the message.

5. The image forming apparatus according to claim 4, wherein the controller causes the display to display the first input screen in a case that the erase instruction is input via the button.

6. The image forming apparatus according to claim 5, wherein the controller causes the display to display the first input screen in a case that the erase instruction is input via the button and a signal indicating that the punch die-set has been mounted on the sheet hole punching apparatus is received.

7. The image forming apparatus according to claim 5, wherein the controller erases the message in accordance with having input the first lubrication completion information via the first input screen.

8. The image forming apparatus according to claim 1, wherein the controller does not initialize the count information in a case that the punch die-set is not mounted on the sheet hole punching apparatus even if the first lubrication completion information is input via the first input screen or the second lubrication completion information is input via the second input screen.

9. An image forming apparatus comprising:
a printer configured to print an image on a sheet;
a puncher configured to perform punch processing on the sheet on which the image is printed, the puncher replaceably mounting a punch die-set for performing the punch process, the punch die-set having a first memory storing identification information for identifying the punch die-set;
a display configured to display information;
a controller configured to obtain the identification information from the first memory of the punch die-set mounted to the puncher; and
a second memory configured to store count information indicating a number of times of execution of the punch process using the punch die-set mounted on the puncher in association with the identification information,
wherein the controller causes the display to display a message for prompting a user to lubricate the punch die-set in accordance with the count information being greater than a predetermined value,
wherein the controller causes the display to display a first input screen for causing the user to input first lubrication completion information indicating a completion of lubrication of the punch die-set in accordance with a predetermined operation by the user after having displayed the message,
wherein in a case that a designation for displaying a second input screen for causing a user to input second lubrication completion information indicating a completion of lubrication of the punch die-set in accordance with an operation being different from the predetermined operation is input in a state that the count information is not greater than the predetermined value and a user has lubricated the punch die-set before the message is displayed, the controller causes the display to display the second input screen,
wherein the controller initializes the count information stored in the second memory in association with the identification information of the punch die-set based on an input of the first lubrication completion information via the first input screen, and
wherein the controller initializes the count information stored in the second memory in association with the identification information of the punch die-set based on an input of the second lubrication completion information via the second input screen.

10. The image forming apparatus according to claim 9, wherein the controller obtains the identification information from the first memory of the punch die-set in accordance with having detected that the punch die-set has been mounted on the puncher.

11. The image forming apparatus according to claim 9, wherein the controller causes the display to display a button that instructs to erase the message.

12. The image forming apparatus according to claim 11, wherein the controller causes the display to display the first input screen in a case that the erase instruction is input via the button.

13. The image forming apparatus according to claim 12, wherein the controller causes the display to display the first input screen in a case that the erase instruction is input via the button and it is detected that the punch die-set is mounted to the puncher.

14. The image forming apparatus according to claim 12, wherein the controller erases the message in accordance with having input the first lubrication completion information via the first input screen.

15. The image forming apparatus according to claim 9, wherein the controller does not initialize the count information in a case that the punch die-set is not mounted on the sheet hole punching apparatus even if the first lubrication completion information is input via the first input screen or the second lubrication completion information is input via the second input screen.

16. A method of controlling an image forming apparatus connected to a sheet hole punching apparatus that applies a punch process to a sheet received from the image forming apparatus, the sheet hole punching apparatus replaceably mounting a punch die-set for performing the punch process, the punch die-set having a first memory storing identification information for identifying the punch die-set, the method comprising:
obtaining the identification information from the first memory of the punch die-set mounted on the sheet hole punching apparatus;
storing, in a second memory, count information indicating a number of times of execution of the punch process using the punch die-set mounted on the sheet hole punching apparatus in association with the identification information;
causing a display of the image forming apparatus to display a message for prompting a user to lubricate the die-set in accordance with the count information being greater than a predetermined value;
causing the display to display a first input screen for causing the user to input first lubrication completion information indicating a completion of lubrication of
the punch die-set in accordance with a predetermined
operation by the user after having displayed the message;

in a case that a designation for displaying a second input screen for causing a user to input second lubrication completion information indicating a completion of lubrication of the punch die-set in accordance with an operation being different from the predetermined operation is input in a state that the count information is not greater than the predetermined value and a user has lubricated the punch die-set before the message is displayed, causing the display to display the second input screen; and initializing the count information stored in the second memory in association with the identification information of the punch die-set based on an input of the first lubrication completion information via the first input screen, wherein the controller initializes the count information stored in the second memory in association with the identification information of the punch die-set based on an input of the second lubrication completion information via the second input screen.

17. A method of controlling an image forming apparatus having a printer that prints an image on a sheet, a puncher that performs punch processing on the sheet on which the image is printed, the puncher replaceably mounting a punch die-set for performing the punch process, and a display that displays information, the punch die-set having a first memory storing identification information for identifying the punch die-set, the method comprising:

detecting whether or not a punch die-set is mounted on the puncher;

obtaining the identification information from the first memory of the punch die-set mounted on the puncher;

storing, in a second memory, count information indicating a number of times of execution of the punch process using the punch die-set mounted on the puncher in association with the identification information;

displaying on the display a message for prompting a user to lubricate the punch die-set in accordance with the count information being greater than a predetermined value;

causing the display to display a first input screen for causing the user to input first lubrication completion information indicating a completion of lubrication of the punch die-set in accordance with a predetermined operation by the user after having displayed the message;

wherein in a case that a designation for displaying a second input screen for causing a user to input second lubrication completion information indicating a completion of lubrication of the punch die-set in accordance with an operation being different from the predetermined operation is input in a state that the count information is not greater than the predetermined value and a user has lubricated the punch die-set before the message is displayed, causing the display to display the second input screen; and initializing the count information stored in the second memory in association with the identification information of the punch die-set based on an input of the first lubrication completion information via the first input screen, wherein the controller initializes the count information stored in the second memory in association with the identification information of the punch die-set based on an input of the second lubrication completion information via the second input screen.

18. A non-transitory computer-readable storage medium storing a program for causing a computer to implement a method of controlling an image forming apparatus connected to a sheet hole punching apparatus that applies a punch process to a sheet received from the image forming apparatus, the sheet hole punching apparatus replaceably mounting a punch die-set for performing the punch process, the punch die-set having a first memory storing identification information for identifying the punch die-set, the method comprising:

obtaining the identification information from the first memory of the punch die-set mounted to the sheet hole punching apparatus;

storing, in a second memory, count information indicating a number of times of execution of the punch process using the punch die-set mounted on the sheet hole punching apparatus in association with the identification information;

causing a display of the image forming apparatus to display a message for prompting a user to lubricate the die-set in accordance with the count information being greater than a predetermined value;

causing the display to display a first input screen for causing the user to input first lubrication completion information indicating a completion of lubrication of the punch die set in accordance with a predetermined operation by the user after having displayed the message;

in a case that a designation for displaying a second input screen for causing a user to input second lubrication completion information indicating a completion of lubrication of the punch die-set in accordance with an operation being different from the predetermined operation is input in a state that the count information is not greater than the predetermined value and a user has lubricated the punch die-set before the message is displayed, causing the display to display the second input screen; and initializing the count information stored in the second memory in association with the identification information of the punch die-set based on an input of the first lubrication completion information via the first input screen, wherein the controller initializes the count information stored in the second memory in association with the identification information of the punch die-set based on an input of the second lubrication completion information via the second input screen.

* * * * *